United States Patent
Yuri et al.

(10) Patent No.: US 6,249,715 B1
(45) Date of Patent: Jun. 19, 2001

(54) METHOD AND APPARATUS FOR OPTIMIZING WORK DISTRIBUTION

(75) Inventors: Hidetaka Yuri; Kiyokazu Kurihara, both of Yokkaichi (JP)

(73) Assignee: Sumitomo Wiring Systems, Ltd., Suzuka (JP)

( * ) Notice: Subject to any disclaimer, the term of this patent is extended or adjusted under 35 U.S.C. 154(b) by 0 days.

(21) Appl. No.: 09/019,698

(22) Filed: Feb. 6, 1998

(30) Foreign Application Priority Data

Mar. 18, 1997 (JP) .................................................... 9-064170

(51) Int. Cl.[7] .................................................... G06F 19/00
(52) U.S. Cl. .......................... 700/111; 700/108; 702/182
(58) Field of Search ........................ 705/9, 8; 700/111, 700/100, 108, 95, 97; 702/182

(56) References Cited

U.S. PATENT DOCUMENTS 5,836,011 * 11/1998 Hambrick et al. ........................ 705/8

FOREIGN PATENT DOCUMENTS

| 2242292 | 9/1991 | (GB) . |
| 7168884 | 7/1995 | (JP) . |
| 90/16023 | 12/1990 | (WO) . |

OTHER PUBLICATIONS

Copy of an International Search Report mailed on Jun. 23, 1998 for counterpart European Patent Application No. 98302018.1.

An article by H. Yuri et al., entitled "Achieving Even Line Balancing of the Wire Harness Assembly Process Through Computer Application", at pp. 84–91 of Wire Journal International, vol. 30, No. 12, Dec. 1997.

An English language Abstract of JP 7–168884.

H. Yuri et al., "Achieving Even Line Balancing of the Wire Harness Assembly Process Through Computer Application", published in the Nov. 1997 issue of *Wire Journal International*.

Pages iii to v of a Japanese language book entitled, "AHP–Analytic Heirarchy Process", published by Nikka Giren Publishing Co. 1986.

* cited by examiner

*Primary Examiner*—Paul P. Gordon
(74) *Attorney, Agent, or Firm*—Greenblum & Bernstein, P.L.C.

(57) ABSTRACT

Method and apparatus for optimizing a work distribution, and in particular, to the optimization of work distribution along an assembly line or in a production process. A difficulty level is set for each task to be performed and a skill level is set for each respective worker. A time variation factor is set based upon the ranked work difficulty and the skill level of the workers. A compensation value is provided in accordance with the worker to whom an operation time of each element work is distributed, based upon a time variation factor. An assigned operation time per worker is maintained in equilibrium among respective workers by distributing each task in a preferential order, based on the compensated operation time.

38 Claims, 20 Drawing Sheets

| WORK CONDITIONS | HALF-LAP TO MAIN CABLE | | BRANCH BINDING | | MOUNTING OF PROTECTOR | |
|---|---|---|---|---|---|---|
| OPERATION TIME (SEC) | HIGHER SKILLED WORKER | 20.0 | HIGHER SKILLED WORKER | 20.0 | HIGHER SKILLED WORKER | 20.0 |
| | LOWER SKILLED WORKER | 22.0 | LOWER SKILLED WORKER | 27.3 | LOWER SKILLED WORKER | 33.7 |
| TIME VARIATION FACTOR | 1.1 | | 1.4 | | 1.7 | |

FIG. 4

| LEVEL OF SKILLFULNESS<br>LEVEL OF<br>WORK DIFFICULTY | 1 | 2 | 3 |
|---|---|---|---|
| A | A1 | A2 | A3 |
| B | B1 | B2 | B3 |
| C | C1 | C2 | C3 |
| D | D1 | D2 | D3 |
| E | E1 | E2 | E3 |

LEVEL OF WORK DIFFICULTY C

LEVEL OF SKILLFULNESS: IN CASE OF 2

OPERATING TIME = BASIC OPERATION TIME X C2

METHOD AND APPARATUS FOR OPTIMIZING WORK DISTRIBUTION

BACKGROUND OF THE INVENTION

1. Field of the Invention

The present invention is directed to a method and apparatus for optimizing a work distribution, and in particular, to the optimization of work distribution along an assembly line or in a production process. This invention is applied, e.g., to assembling a wire harness, or a subassembly (hereinafter referred to as wire assembly) which forms a wire harness.

2. Discussion of Background and Other Information

Industrial products are generally manufactured using complex and multiple handling procedures. When large products, having a number of components, such as, for example, wire harnesses, are manufactured, more work space and additional workers may be involved.

A wire harness is an electrical network of, for example, a car, and may be considered to be equivalent to the nervous system of a human body. The wire harness has a plurality of branches derived from junction points on a main line (or sometimes from another branch line). Each wire that makes a connection from one branch to another branch has a crimped terminal that is inserted into an associated connector.

The assembly line for manufacturing a wire harness is based upon a preestablished standard time for manufacturing the product. However, when the number of operators (workers) or their positions at each station of the assembly line changes, the actual assembly time required to manufacture the wire harness changes from the preestablished standard time. This usually happens when new or less skilled workers are positioned at work stations that require a high degree of skill.

The process of assembling a wire harness may include a manufacturing process, an arranging process, a selecting process, and a gross-assembly process. For example, the wire harness manufacturing process begins by making one or more sub-assemblies (e.g., the manufacturing process). Each sub-assembly comprises some connectors and wires with crimped terminals on each extremity. The sub-assembly is then laid upon an assembly table (e.g., the arranging process), where a junction position is determined through the use of appropriate jigs (e.g., the selecting process) for additional wiring. When all the wiring is finished, the main line and the branch lines are bundled with, for example, vinyl tape, tubing, or other sheathing material (e.g., the gross-assembly process).

Most of these respective processes are performed by a flow production assembly line of approximately 10 to 20 workers. Some assembly processes may require significant manual assembly. In such manual assembly cases, the man-hours (assembling real man-hours) required to perform the work when a production variation occurs (or when one or more assembly workers are absent) greatly exceed a predetermined normal man-hours (preestablished standard man-hours) required to perform the work, resulting in delays and backlogs in the assembly process, and possibly affecting the quality of the completed product. Therefore, a conventional assembly line employs a manager who controls the work flow of the assembly line. The manager carries out the work distribution (work flow) based upon his experience and intuition by judging the length of experience and work capabilities of each worker in the assembly line.

The work distribution in the above-discussed assembly line frequently calls for the manager to consider the skill level of each worker, whether any workers are absent, the difficulty level of the work to be performed by the individual workers, and the difficulty in quantifying the same. As a result, it is often difficult to maximize the worker efficiency or to optimize the handling distribution.

In addition, when manufacturing comparatively large size products, such as, for example, a wire assembly, it becomes even more difficult to optimize the assembly procedure, due to the need to assemble or arrange components according to a work order determined in a preferential order on a drawing board (work bench) with a size of approximately 0.8 m by 4 m.

SUMMARY OF THE INVENTION

Accordingly, an object of the present invention is to provide an optimizing procedure for the distribution of work that is capable of optimizing the work distribution in an assembly line, while eliminating possible errors made by the manager.

In order to solve the above-mentioned problem, the present invention provides an optimized work distribution for each worker. A difficulty level is set for each element work (task) and a skill level is set for each respective worker. A time variation factor is set based upon the ranked work difficulty and the skill level of the workers. A compensation value is provided in accordance with the worker to whom an operation time of each element work is distributed, based upon a time variation factor. An assigned operation time per worker is maintained in equilibrium among respective workers by distributing each element work in a preferential order, based on the compensated operation time.

It is understood that the phrase "element work", as employed in the present application, is analogous with the terms "job", "task" and "operation", and each term may be interchangeably employed.

By the present invention, a difficulty level for each task (element work) for the flow production, and the skill level of the respective workers are ranked, from which a time variation factor is created. A work difficulty level for each task (element work) is determined by a questionnaire, based on, for example, an AHP (Analytical Hierarchy Process), while the skill level of each worker is determined based upon, for example, the worker's years of work experience plus a test that measures real times required to perform predetermined tasks.

An x-y matrix is formed based upon the determined difficulty levels versus the skill levels, with a time variation factor being assigned to each intersection point (e.g., a point where an x-axis intersects a y-axis) for carrying out each element work. The time variation is required because the range of time required for a worker to perform a task (e.g., the time required for a skilled and non-skilled worker to perform a predetermined task) increases in relation to the difficulty of the work to be performed. That is, a non-skilled worker may require, for example, 10 percent additional time to perform a simple task, as compared with a skilled worker, but, if a complex task is to be performed, the non-skilled worker may require, for example, 40 percent more time to complete the task as compared to the skilled worker.

Determining the time variation factor for the skill level of the workers and the level of difficulty of each element work permits an efficient distribution of element work among the various workers when one or more workers are absent. By assigning a time variation factor to each worker for each specific task, it is possible to calculate predicted operation times to develop an optimum work distribution. By assigning each element work to respective workers so that an assigned operation time per worker is kept in equilibrium with the predicted operation time between respective workers (based on a calculated predicted operation time), the operation time for respective workers can be made equal (or nearly equal) within a minimum operation time.

It is desired to maintain an assigned operation time per worker, among respective workers, in equilibrium, so that a balanced operation time among each worker will not exceed a predetermined allowance. In other words, in this portion of the process, the goal is to equalize the operation time for each worker, so that substantial uniformity in working time per worker is achieved. While 100 percent equalization is not required, 90 percent equalization is desired.

According to another embodiment of the present invention, a work distribution is optimized for a plurality of workers in handling a flow production consisting of multiple element works, the order of assembly being determined based upon a preferential order in accordance with the plurality of workers along a conveyor which transfers products, comprising;

determining a normal operation time per worker, based on a total man-hours to be worked and the total number of workers to be assigned;

assigning multiple working areas to be divided with the products in a continuous manner in a reverse-flow direction to the conveyor;

classifying the multiple element works into an area-wise divided object working group that is sub-dividable in each assigned area and a non-area-wise divided object work group which is undividable into each area;

sub-dividing each task (element work) classified in the non-area-wise divided object work group among the multiple element works (tasks), into a prior handling group to be handled in advance for each element of work of the area-wise divided object work group, and into a post handling group to be handled later;

distributing an element of work classified into the prior handling group by a normal operation time unit, in an order from an upper end worker in a production flow, in such a way as to maintain the order of its process;

distributing, by a normal operation time unit in the order from a lower end worker in a flow production, an element work subdivided into the prior handling group with the order of work processes maintained;

grouping the elements classified into an area-wise divided object work group after distributing both handling groups under a normal operation time unit in an order from an upper end worker in the flow production; and keeping an assigned operation time per worker among respective workers in equilibrium by selectively replacing the elements of work in the non-area-wise divided object group and the elements of work of an area-wise divided object group when a variation arises in an operation time. It is noted that no unduly large structural element work for respective workers will occur, owing to the replacement of element works carried out between adjacent groups. In short, no worker on the line should be over-burdened or have a disproportionate amount of work to do.

In setting the normal operation time per worker and distributing an element of work by the normal operation time unit, the above-mentioned products are split into multiple work areas, in a direction contrary to the conveyor flow direction and are successively assigned to respective workers. By setting this work area, the workers can work in a direction different from the direction of a conveyor transport, decreasing the amount of movement required by the workers, and thus, increasing their work efficiency.

Each element of work is classified into an area-wise divided object work group comprising element works (tasks) that can be sub-divided in accordance with the above-mentioned work area, and into a non-area-wise divided object work group. The non-area-wise divided object work group is sub-divided into a prior handling group which advances prior to the area-wise divided object work group and a post handling group which follows later. The sequence of work to be performed is specified, thereby making it possible to carry out the distribution of each work group without disturbing the right order of the whole work flow. In addition, in order to keep the assigned operation time per worker in equilibrium, the system selectively replaces an element work (a task) of a non-area-wise divided object work group and an element work (a task) of an area-wise divided object work group with adjacent groups in a condition to maintain a preferential order in an area relating to the corresponding element work, so that the distribution of work can be kept in equilibrium. In this case, the expression of "selectively" means replacement of only the element work of a non-area-wise divided object work group in accordance with the condition of its variance, at replacement of only the element work of an area-wise divided object work group, or replacing any element work of both object work groups. Alternately, the replacement may be carried out either by changing the operation time value per worker, in a general manner, or by individually changing the distribution of element work.

According to an embodiment of the present invention, an optimized work distribution comprises:

carrying out a production flow, based on an assigned operation time per determined worker;

measuring the operation time per respective worker from among a plurality of workers;

determining when a real operation time exceeds the assigned operation time by a predetermined tolerance;

comparing the real operation time and the assigned operation time to determine an excess time; and splitting an element of work closest to the operation time, which halves the excess time to an adjacent group in a condition that maintains an assembly order.

According to the present invention, when the real operation time exceeds the assigned operation time by the predetermined tolerance, each element work is re-distributed in a condition maintaining the work order.

Furthermore, there may be a case in which the element works of the area-wise divided object work group and the non-area-wise divided object work group include the specified one by regarding a multiple element work as a single element work.

By the present invention, a multiple element work may be integrally distributed and replaced as a single work. For example, when handling cable terminal components in the manufacturing of a wire assembly, three kinds of work are required, such as, for example, taping the wire assembly at a terminal area, mounting a corrugated tube, and fixing the corrugated tube with tape. When separating these jobs into separate tasks (element works), there is a possibility that a series of work may be finished by an individual worker before other workers are ready to perform their respective tasks. This reduces the efficiency of the job production because the work must be held "in reserve" until the "slower" workers catch up to the "faster" worker. If a "slower" worker attempts to accelerate his assembly work beyond his capability, he may make an error in the assembly procedure (e.g., the worker may forget to, for example, insert one or more terminals into a connector), reducing the quality of the finished product.

Furthermore, before grouping each element work classified in the area-wise divided object work group in a processing order by a normal operation time unit, when a group not reaching the normal operation time exists, it is preferable to include a step which distributes the area-wise divided object work group in such a way that a desired order sequence is maintained.

By the present invention, a group which does not reach the normal operation time per worker may occur when dividing the non-area-wise divided object work group into groups. In such a situation, operation times of the whole groups can be kept in equilibrium by re-distributing an element work of the area-wise divided object work group.

The present invention classifies an element work into an area-wise divided object group and a non-area-wise divided object group, by ranking a difficulty level of each element work to be performed and a skill level for respective workers of a plurality of workers. A time variation factor, related to the difficulty level for the particular work and the skill level of the workers, is set. An operation time of each element work, in accordance with the worker's ability, is adjusted, based on the time variation factor. The assigned operation time per worker is then held among the respective workers.

The present invention determines a factor between a skill level of a particular worker and a difficulty level for each element work, in which each element work is classified into groups. The present invention distributes an element work based upon the presence and absence of workers, the level of skill of the workers and the difficulty of the work to be performed. In addition, by assigning a particular element of work to a specific worker, based upon an assigned operation time per worker among respective workers, the operation time of the respective workers can be made as uniform as possible, minimizing the required assembly time.

The present invention relates to subject matter contained in Japanese Patent Application HEI 9-64170, filed on Mar. 18, 1997 and an article entitled "Achieving Even Line Balancing Of The Wire Harness Assembly Process Through Computer Application" by Hidetaka YURI et al., starting at page 84 in the December, 1997 issue of *Wire Journal International*, (Vol. 30, No. 12) which are expressly incorporated herein, in their entireties.

BRIEF DESCRIPTION OF THE DRAWINGS

The foregoing and other objects, features, and advantages of the invention will be apparent from the following more particular description of the invention, as illustrated in the accompanying drawings, which are presented as a non-limiting example, in which reference characters refer to the same parts throughout the various views, and wherein:

FIG. 4 is a diagram illustrating an operation time measurement;

FIG. 5 is a matrix diagram illustrating a relationship between a skill level of a worker and the work difficulty level for each element work (task);

FIGS. 6(A) and 6(B) are schematic drawings illustrating a motion line model of a worker, in which FIG. 6(A) represents an efficient motion, while FIG. 6(B) represents an inefficient motion;

FIGS. 17(A) and 17(B) represent pitch diagrams graphically showing a re-distribution process, in which FIG. 17(A) represents a state before distribution and FIG. 17(B) represents a state after distribution;

FIGS. 18(A) and 18(B) represent pitch diagrams graphically showing a re-distribution process, in which FIG. 18(A) represents a state before distribution and FIG. 18(B) represents a state after distribution;

FIGS. 19(A) and 19(B) represent pitch diagrams graphically showing a re-distribution process, in which FIG. 19(A) represents a state before distribution and FIG. 19(B) represents a state after distribution.

DETAILED DESCRIPTION OF THE PREFERRED EMBODIMENT

Figure 1:
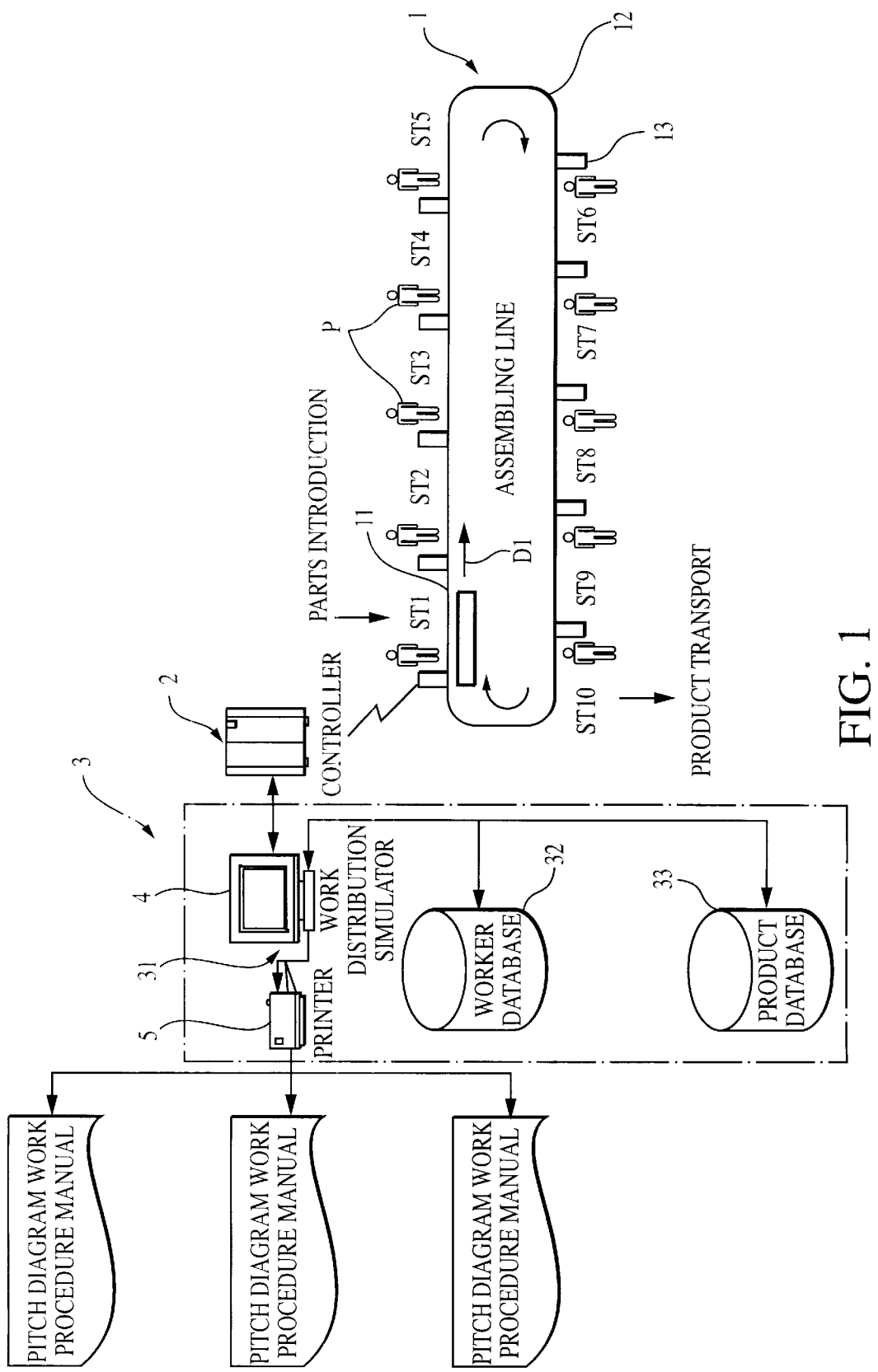
FIG. 1 is a schematic diagram of an assembly facility for an embodiment of the present invention.

FIG. 1 illustrates a structural drawing of an assembly line according to an embodiment of the present invention. The assembly line comprises an assembling line upon which a product, such as, for example, a wire harness, is assembled, a controller 2 that controls the operation of the assembling line 1, and a work distribution simulator 3 that provides data to the controller 2 to control the operation of the assembling line 1. Although shown for use with the assembly of a wire harness, the present invention is equally applicable to other assembly line processes.

The assembling line 1 of the present embodiment is constructed to carry out a flow production, by having a transport plate 11 travel around the assembling line 1 in a clockwise direction, indicated by arrow D1, to transport a work W (not shown) thereon, which, when completed, will form a wire harness. The transport plate 11 moves about the assembling line 1 by an endless conveyor 12. The assembling line 1 is divided into a plurality of stations STz (e.g.; ST1 to ST10) around the assembling line 1. A worker P is assigned to each station ST1 to ST10. In the case of a wire harness production line, the transport plate 11 has a plurality of clamps and yokes attached to it, for receiving a variety of sub-component assemblies which are to be assembled together.

Figure 2:
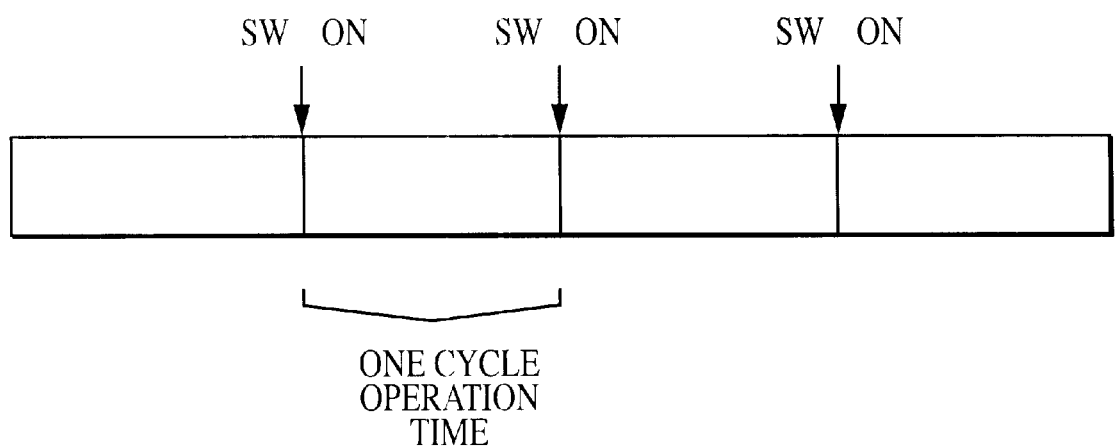
FIG. 2 is a drawing illustrating an operation time of a worker in the assembly facility of FIG. 1.

Each station ST1 to ST10 includes a work switch 13 that is operable by the worker P assigned to the respective station. In the disclosed example, the work switch 13 comprises, for example, a wireless switch (e.g., a switch that issues an IR or RF signal upon actuation). However, other types of switches, such as, for example, hardwired switches, may be employed without departing from the spirit and/or scope of the present invention. Each worker P actuates their respective work switch 13 immediately upon completion of their assigned work (e.g., completion of one work cycle by a worker P), so that a time required to perform the assigned task (hereinafter referred to as "an actual operation time") can be measured, as shown in FIG. 2.

The controller (control device) 2 functions to add (sum) the actual operation time by one respective worker P, control a driving system (not shown) of the assembling line 1 to drive the conveyor 12, and to receive the signal issued by the work switch 13 associated with each respective station ST1 to ST10.

In the disclosed embodiment, the work distribution simulator 3 comprises a computer 31, such as, for example, a personal computer, having a storage device, such as, but not limited to, for example, a hard disk drive, a floppy drive, an optical storage device (e.g., CDROM, CD-R, CD-RW, DVD-ROM, DVD-RAM), a display 4 and a printer 5 that is connected to the computer 31. In addition, the work distribution simulator 3 includes a worker database 32 and a product database 33, both of which are interfaced to the computer 31. While the present invention discloses the use of a general purpose personal computer, a specialized controller, such as, for example, a numerical controller, can be employed without departing from the spirit and/or scope of the instant invention.

The computer 31 operates in response to a work distribution program installed on the storage device. The work distribution program assigns specific tasks jobs, works) to the respective workers P, based upon a level of difficulty of each task, and a skill level of the respective workers P.

The worker database 32 contains the names of each worker P and their levels of skill for each job task (element work). The levels of skill for each element work (task) for each worker P are stored in the database 32 in a digitally numeric form. In the disclosed embodiment, three criteria are used to determine the skill level for each respective worker P; that is, the skill level for each worker P is based upon (a) the years of experience for each respective worker P, (b) measured actual operation times for performing the various tasks, and/or (c) supervisor evaluations. However, it is noted that other methods may be used to determine the skill level for each worker to perform certain tasks without departing from the spirit and/or scope of the instant invention.

The product database 33 stores article number data related to the components required to produce the manufactured item (e.g.; the wire harness) on the assembling line 1. This makes it possible to update and revise the data using the computer 31. It is noted that in the current embodiment, data representing difficulty levels per element work are contained in the product database 33. Difficulty levels for each element work are determined, for example, using a questionnaire based on an Analytical Hierarchy Process (AHP) which is described in detail in a publication entitled "Game Sense And Decision-Making Process", by Kaoru TONE, published by Nikka Giren Publishing Co. (1986), which is incorporated herein in its entirety, and/or by measuring operation times for each element work. However, it is noted that other methods may be employed to determine the difficulty levels for each element work without departing from the spirit and/or scope of the present invention.

Figure 3:
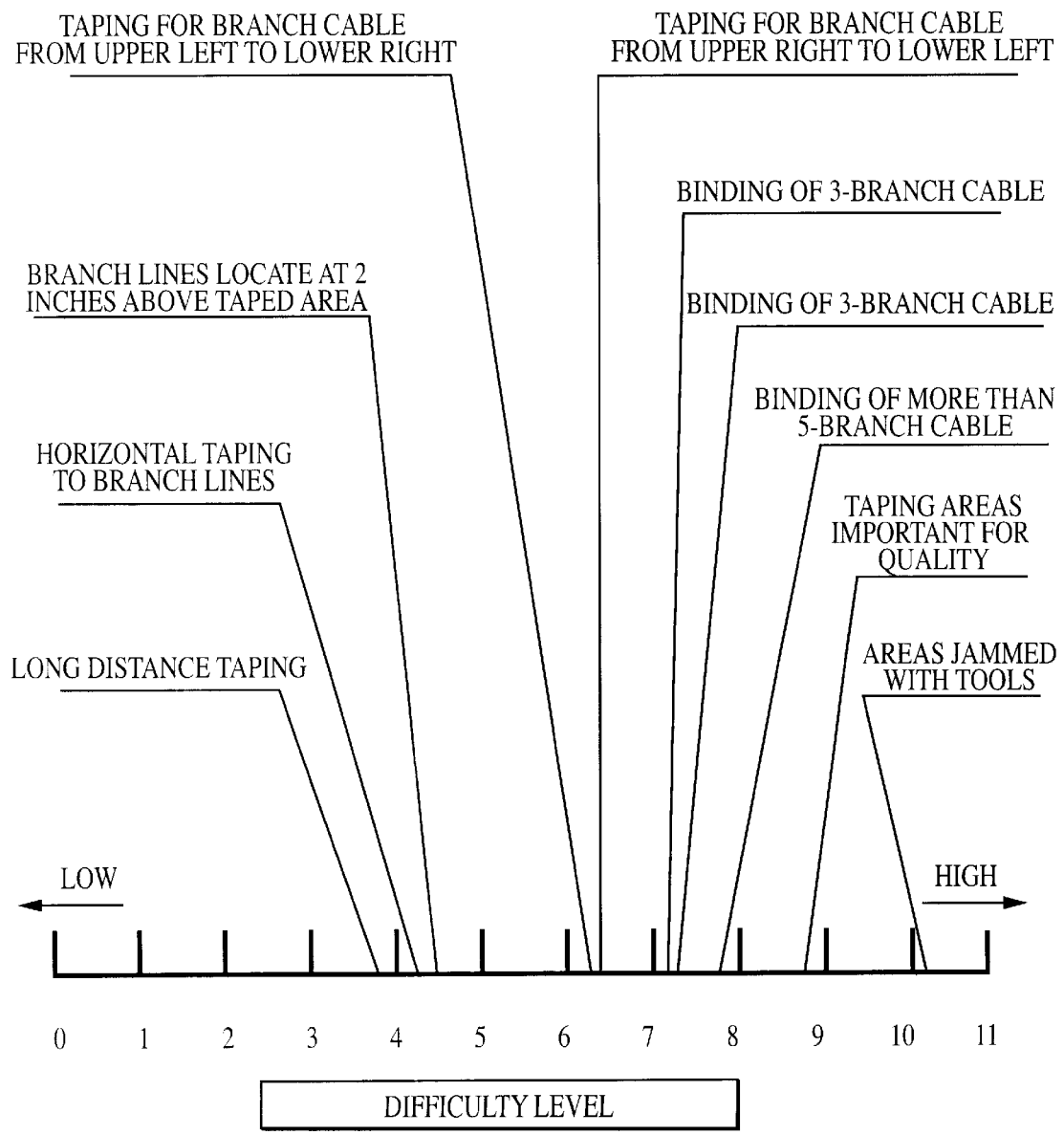
FIG. 3 is a diagram illustrating a level of difficulty for a taping process associated with a wire harness produced according to the process of the instant invention.

FIG. 3 represents a diagram showing difficulty levels of various tasks (element works) required to manufacture the wiring harness. FIG. 3 illustrates the results of the questionnaire used to determine the difficulty level for certain tasks (element works) performed by the workers P to construct the wiring harness. Based upon the questionnaire, it was determined, for example, that, with respect to a taping operation, taping work around a main line with a comparatively long harness is the easiest. A taping operation becomes progressively more difficult as one tapes in a direction horizontal to a branch line; taping at a point two inches apart from the branch line; and then taping to a branch in a direction from an upper left side to a lower right side, with taping tasks requiring the use of a plurality of tools being the most difficult task. Based on the results of the questionnaire, the difficulty level for each element work is assigned, and stored in the product database 33.

A time variation factor is then assigned to each element work (task) to take into account variances in the skill level of the various workers for performing certain tasks (element works). The manner in which the time variation factor is obtained will be described below with reference to FIG. 4. The time variation factor (i.e.; a correlation coefficient) is based on observed findings. However, other methods (schemes) can be employed to determine time variation factors. The time variance factor is based upon the assumption that the higher the difficulty level of a particular task (element work), the greater the time required for an unskilled worker to perform the task as compared to a skilled worker. That is, for a relatively simple task, an unskilled worked may require only a small additional time (e.g.; ten percent more time) than the skilled worker to complete the task. However, with respect to a difficult task, the unskilled worker may take a significantly longer (e.g.; fifty percent longer) time to complete the task as compared to the skilled worker. The manner in which the time variance factor is determined will be discussed below.

FIG. 4 illustrates a diagram showing an example of an operation time measurement, to catalog model workers as skilled workers and unskilled workers according to the judgment of a supervisor (manager), in which operation times were measured for various workers to perform a plurality of different tasks (element works). For example, the supervisor may determine that a highly skilled worker takes 20 seconds to perform a branch winding operation, whereas an unskilled worker requires 27.3 seconds to perform the same task (resulting in a time variation factor of 1.4 ((27.3−20)/20) between the skilled and unskilled workers. Similarly, a skilled worker may perform a mounting operation in 20 seconds, while a lesser skilled laborer may require 33.7 seconds for the same task, resulting in a time variation factor of 1.7 ((33.7−20)/20).

The diagram of FIG. 4 illustrates that the higher the skill level, the greater the time difference generally becomes between skilled workers and the unskilled workers. Based upon the data obtained in FIG. 4, a matrix is obtained (see FIG. 5), which is stored in a memory, showing a relationship between a skill level of each worker and a work difficulty level for the element work, by individually assigning a time variation factor to every combination in a table in which both levels are two-dimensionally arranged.

Then, every element work is classified. The classification is performed to ensure that each element work (task) does not become so difficult as to slow down (or halt) the other workers in the assembling line 1, and so that an undue number of workers will not need to work on any given task or at any particular work station.

Figure 6A:
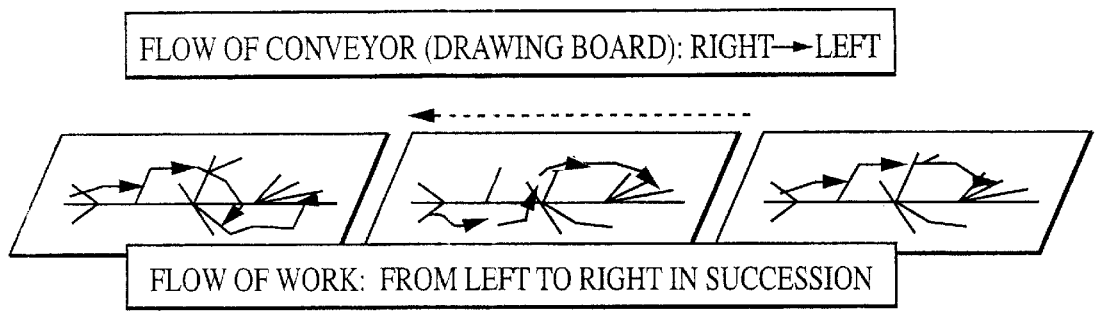
Figure 6B:
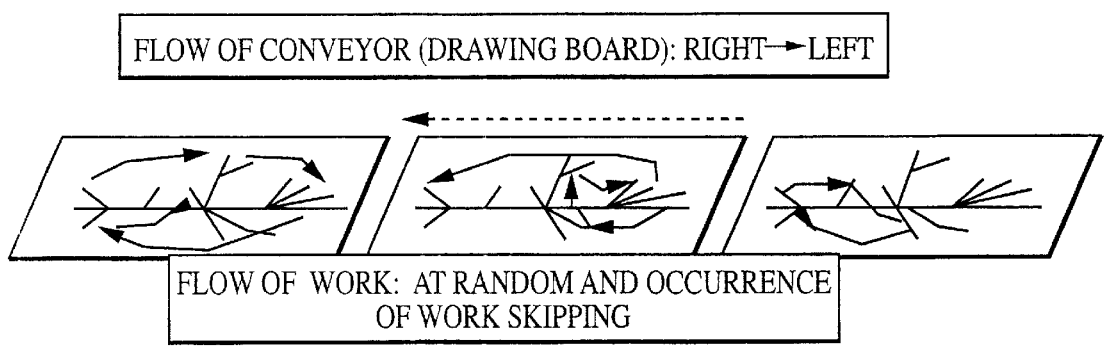

FIGS. 6(A) and 6(B) represent a schematic drawing showing the travel path (flow) of the conveyor on the drawing board, and the flow of work that is produced. FIG. 6(A) represents a work flow that is efficient, whereas, FIG. 6(B) represents a work flow that is inefficient.

As shown in FIG. 6(A), worker P carries out (performs) work in succession along a direction opposite to the travel path D1 (see FIG. 1) of the transport plate 11. As a result, each worker performs each task in a condition in which each worker's position remains relatively stationary (that is, the workers do not have to move about the assembling line 1). On the other hand, the inefficient arrangement of FIG. 6(B) requires that the worker P move against the flow of the transport plate 11, and thus, the motion of each worker becomes complicated. As a result of additional walking and random motion, it takes longer for each worker in FIG. 6(B) to complete a particular task (element work).

While the arrangement of FIG. 6(B) is undesirable, it is noted that situations may arise, such as, for example, when a large sized wiring harness is fabricated, where such an arrangement exists. In such a situation, it may be desirable to designate multiple work areas for assembly/production of he product.

Figure 7:
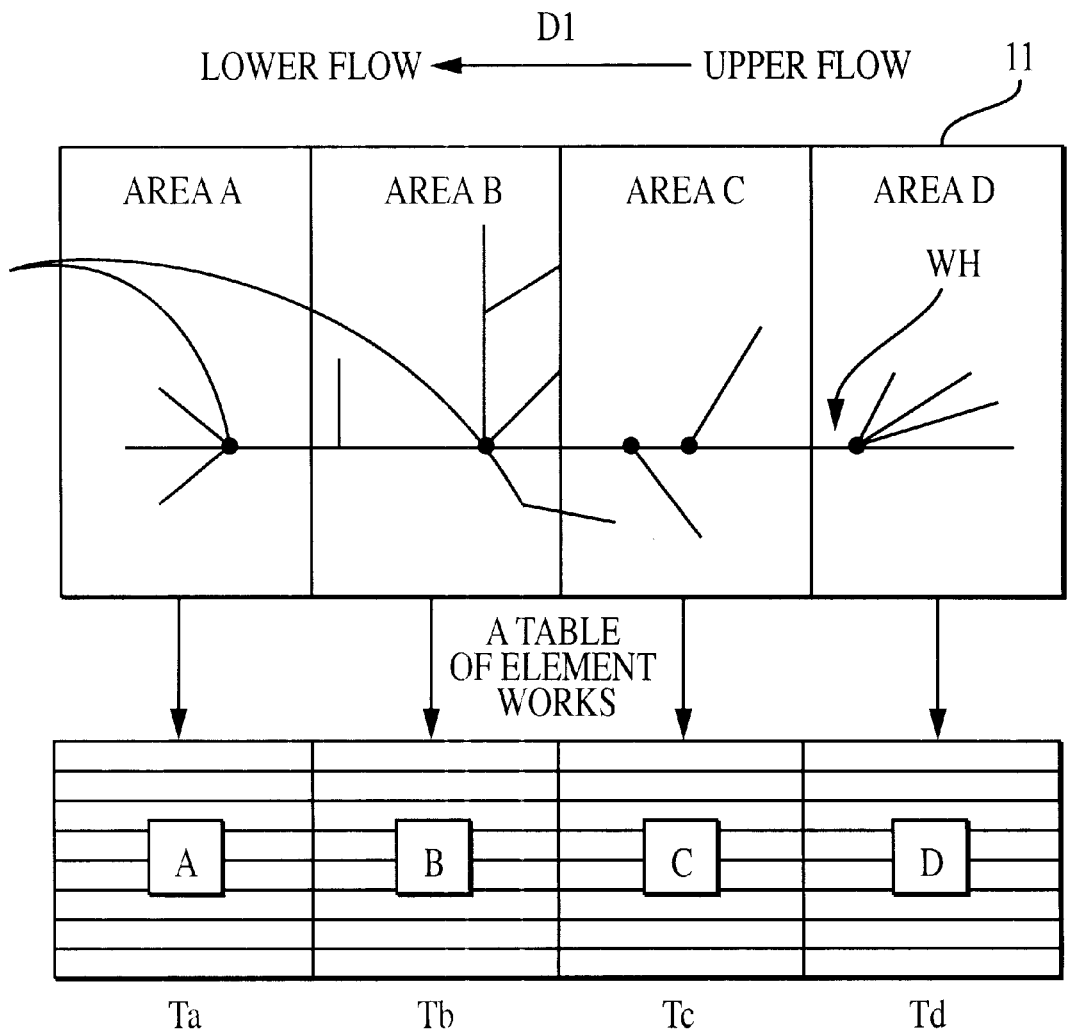
FIG. 7 is a schematic drawing of a transport plate showing an assigning example of a work area.

FIG. 7 illustrates a schematic drawing of a transport plate 11 in which the work area is divided into plural (e.g., four) work areas A to D. In the example illustrated in FIG. 7, a large branching area (e.g., an area where a main line and at least one branch are separated) is, for example, formed with 4 pieces. Work areas A to D are sub-divided by focusing on a branched area of the 4 pieces. Each element work is classified, and is registered in the database 33 as work data of the corresponding product with regard to this area-wise division. This division is based on the assumption that a typical worker has a "reach" (the distance that a worker can extend his arms) of approximately 0.9 m without having to move his body. Thus, by dividing the work area into four areas A to D, the transport plate 11 can have a length of 3.6 m (0.9 m times 4). If the work area is divided into three areas, the transport plate 11 can have a length of 2.7 m (0.9 m times 3).

In this case, the element work (task) is divided into sub-dividable element works (i.e.; into smaller, sub-tasks) for each work area from area A to area D. It is noted that a group consisting of a non-sub-dividable element work (a task that can not be divided into smaller sub-tasks) can co-exist with a sub-dividable element work, depending on the product to be manufactured. For example, when assembling a wire harness, the operation (task) of taping the cable and the operation of mounting the outer jacket lends themselves to be sub-dividable for every work area from work area A to work area D. However, an operation to manufacture a sub-assembly, or to arrange the cables on the transport plate 11 do not lend to the separation (dividing) of the work area for these tasks.

In the present application, the phrase "area-wise divided object work group" means a group consisting of sub-dividable element works within each work area A to D. The phrase "non-area-wise divided object work group" means an element work that can not be sub-divided. Nonetheless, all element work classified into each work group has a preferred assembly order, i.e.; a preferred sequence for performing the same.

Each work group is classified into respective work groups, maintaining the preferred assembly order of the element work over the whole assembly of each element work.

Furthermore, in the element works (tasks) classified in the "non-area-wise divided object group", there is one element work (task) that is carried out prior to the element works (tasks) contained in the "area-wise divided object work group", and another carried out after the tasks in the "area-wise divided object work group". By sub-classifying the "non-area-wise divided object group" into a prior handling group while classifying the "area-wise divided object work group" into a post handling group, it is possible to more efficiently carry out work distribution.

The worker database 32 and the product database 33 may be stored on the storage device associated with the computer 31, or on an external memory device, such as, for example, a floppy disk, CD-ROM, a magnetic disk, a magneto-optical disk, an optical disk, or other storage devices. The worker database data and the product database data are frequently updated; and, thus, it is desirable to provide the computer 31 with an input device C (such as, for instance, a keyboard and mouse) that enables easy updating of the data.

By storing the program in the computer 31, the distribution of work among each worker P can be simulated/estimated, based on the data entered in databases 32 and 33. As previously noted, the computer 31 is interfaced to the controller 2. The computer 31 outputs instructions to the controller 2, according to a program illustrated in FIG. 8, which will now be described.

Figure 8:
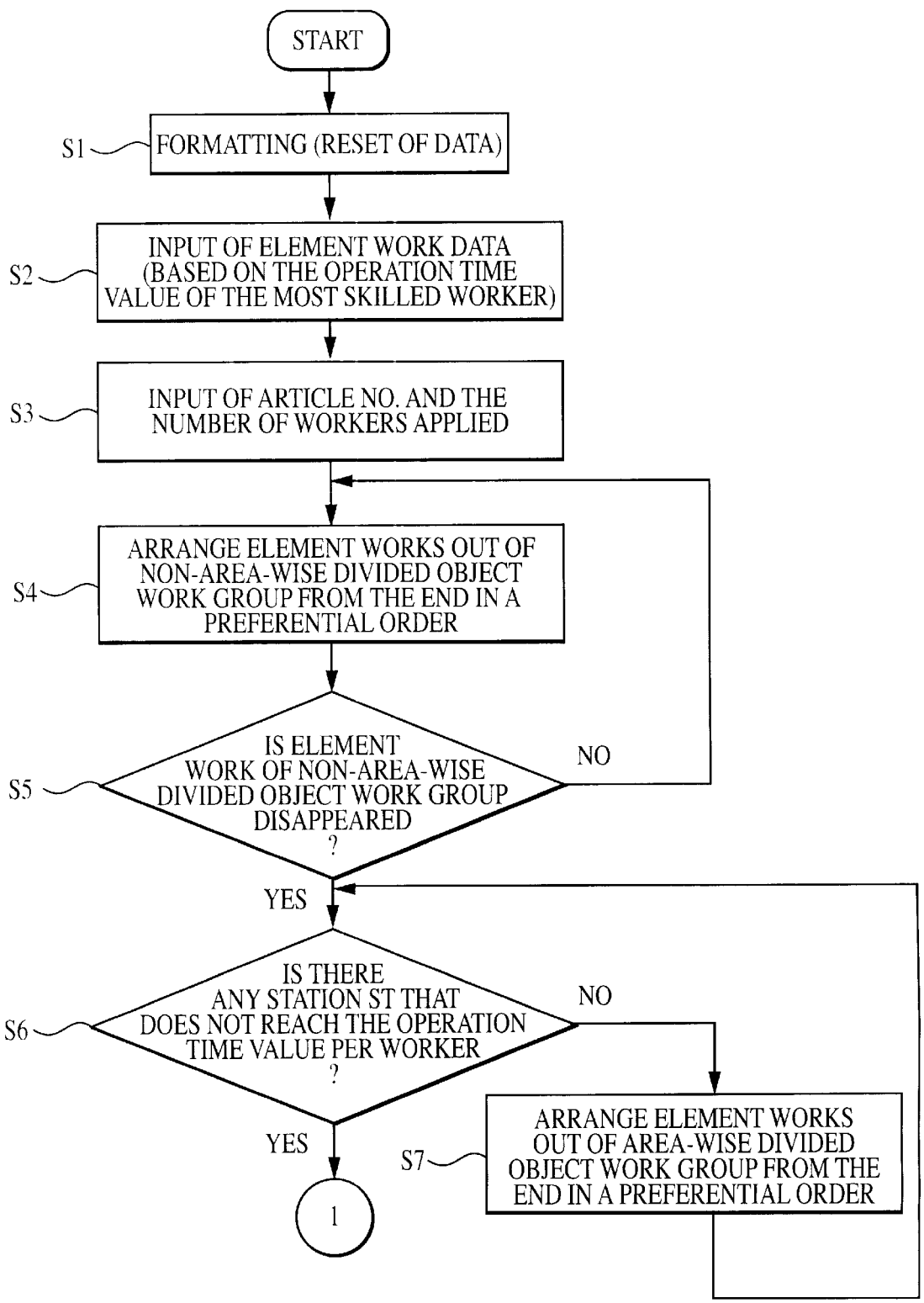
FIG. 8 is a flowchart illustrating a work distribution program according to an embodiment of the present invention.
Figure 9:
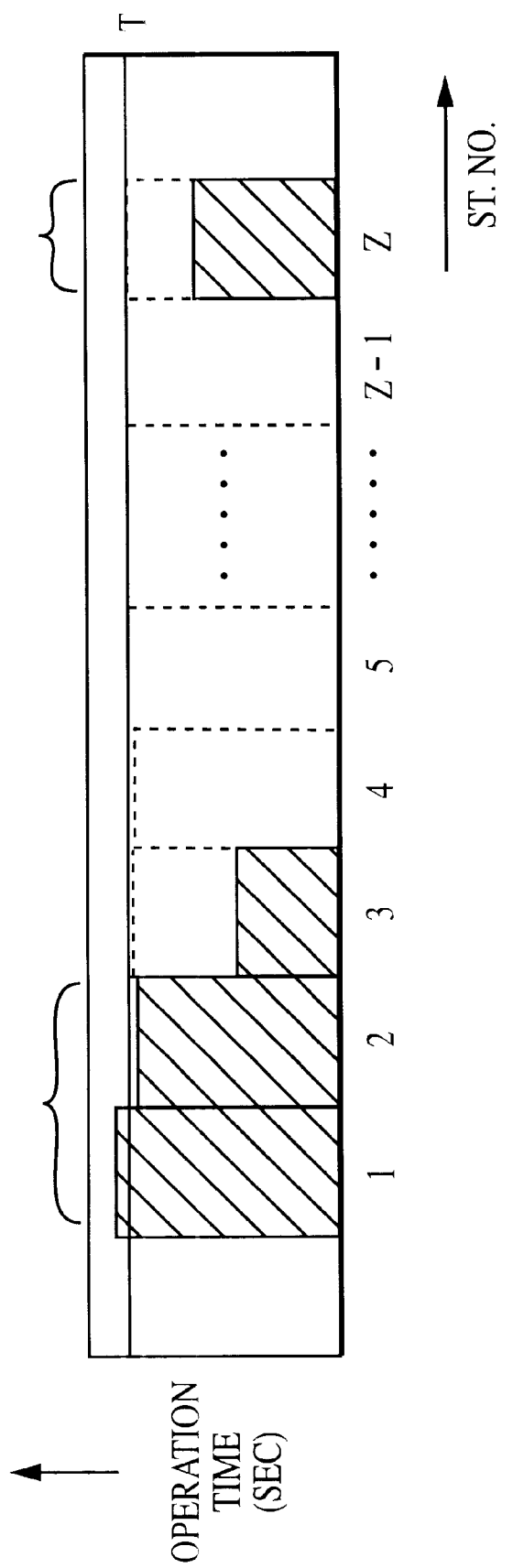
FIG. 9 is a drawing graphically illustrating a distributed element work, based on the flowchart of FIG. 8.
Figure 10:
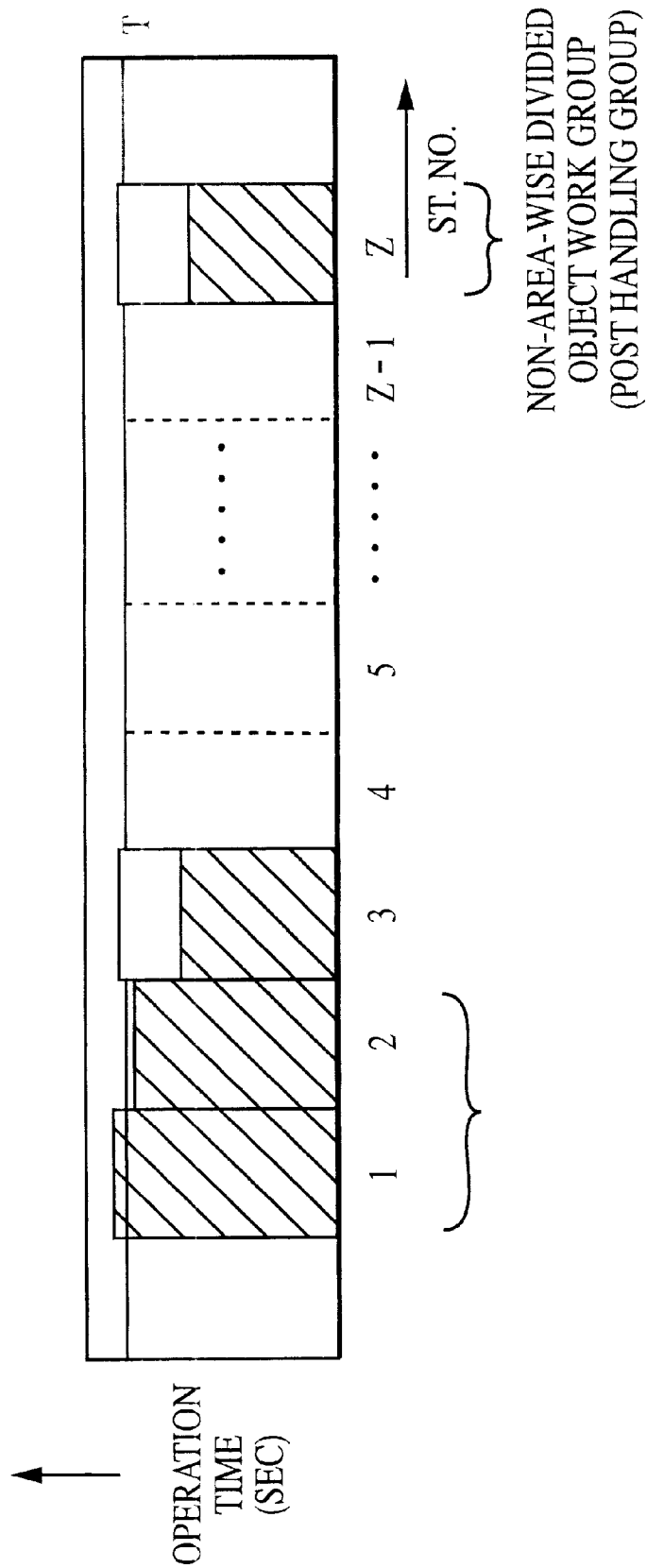
FIG. 10 is another drawing graphically illustrating the distributed element work, based on the flowchart of FIG. 8.

FIG. 8 represents a flowchart illustrating a work distribution program according to an embodiment of the present invention. FIGS. 9 and 10 represent drawings graphically illustrating elements distributed according to each step of the flowchart in FIG. 8. It should be noted that, for purposes of clarity, certain initializing steps are not illustrated in the flowchart of FIG. 8. The initializing steps include, e.g., a formatting program (e.g.; an initial form setting program), a re-formatting program (e.g.; an initial form re-setting program), and a printing program.

With reference to FIGS. 8–10, when the above mentioned work distribution program is run, step S1 is executed to initialize (re-set) the data related to, for example, the element works (tasks) and workers' registration (e.g., identification by name or number). In step S2, element work data, including data read from the product database 33, is inputted by a "system operator". As used in this application, the phrase "system operator" does not mean a worker who only handles a system, but rather, a chief engineering staff, line leader or the like in the field. At this point, an operation time value represents the operation time value of the most skilled worker.

Under certain conditions, multiple element works may be considered to be equivalent to a single element work. For example, when handling work for a cable end area when assembling a wire assembly, three works (tasks) are involved; taping the end areas of the wires, mounting a corrugated tube over the wires, and fastening the corrugated tube with tape. When these tasks are separated into individual element works, such that they are performed by different workers, job efficiency drops, because one worker tends to finish his task prior to the other workers, and then he must wait until the other workers "catch up". In addition, in the case in which multiple terminals are inserted into a same connector, the possibility exists that the close proximity of the workers may result in a worker forgetting to insert a terminal. Therefore, in such instances, the multiple element works are thought of as being equivalent to a macro, which is then considered to be a single element work.

After the data is read, based on the data contained in the databases 32 and 33 in step S3, the number (z) of available workers P is inputted and the number of the article to be manufactured is brought out by the system operator.

At step S4, an element work from the non-area-wise divided object work group among the element work is distributed (arranged) from its end in a preferred sequential order. Step S4 is repeated until such time as the element work of the non-area-wise divided object work group disappears (step S5). The non-area-wise divided object work group is classified into a prior handling group to be handled prior to the area-wise divided object work group, and a post handling to be handled after the handling of the area-wise divided object work group. In this regard, the phrase "distributed (arranged) from its end in a predetermined order" means to take out the top (i.e., first) element work in the prior handling group in the order, while in the post handling group taking out the last element work in the order.

With this in mind, when each element work is distributed, via steps to be discussed below, in each station STZ, where Z equals 1 to 10 in the embodiment shown in FIG. 1, an element work in the prior handling group, as viewed from an upper flow side of the assembly line to a lower flow side of the assembly line an element work in the post handling group are respectively stacked at an operation time value T for every station. Each element work thus stacked is handled as one conceptual group.

After the distribution of the element work is finished, program step S6 is executed to determine whether a station STz to which an element work has been distributed does not reach the operation time value T per worker, based upon the formula:

$$G_T < T - \alpha,$$

where "$G_T$" represents a total operation time value for one group required for the distributed element work, "$\alpha$" is an allowance, and "T" represents the operation time value. It is noted that when $G_T$ is smaller (less) than T minus $\alpha$, a determination is made that one or more element works (tasks) can still be added to a station.

Figure 11:
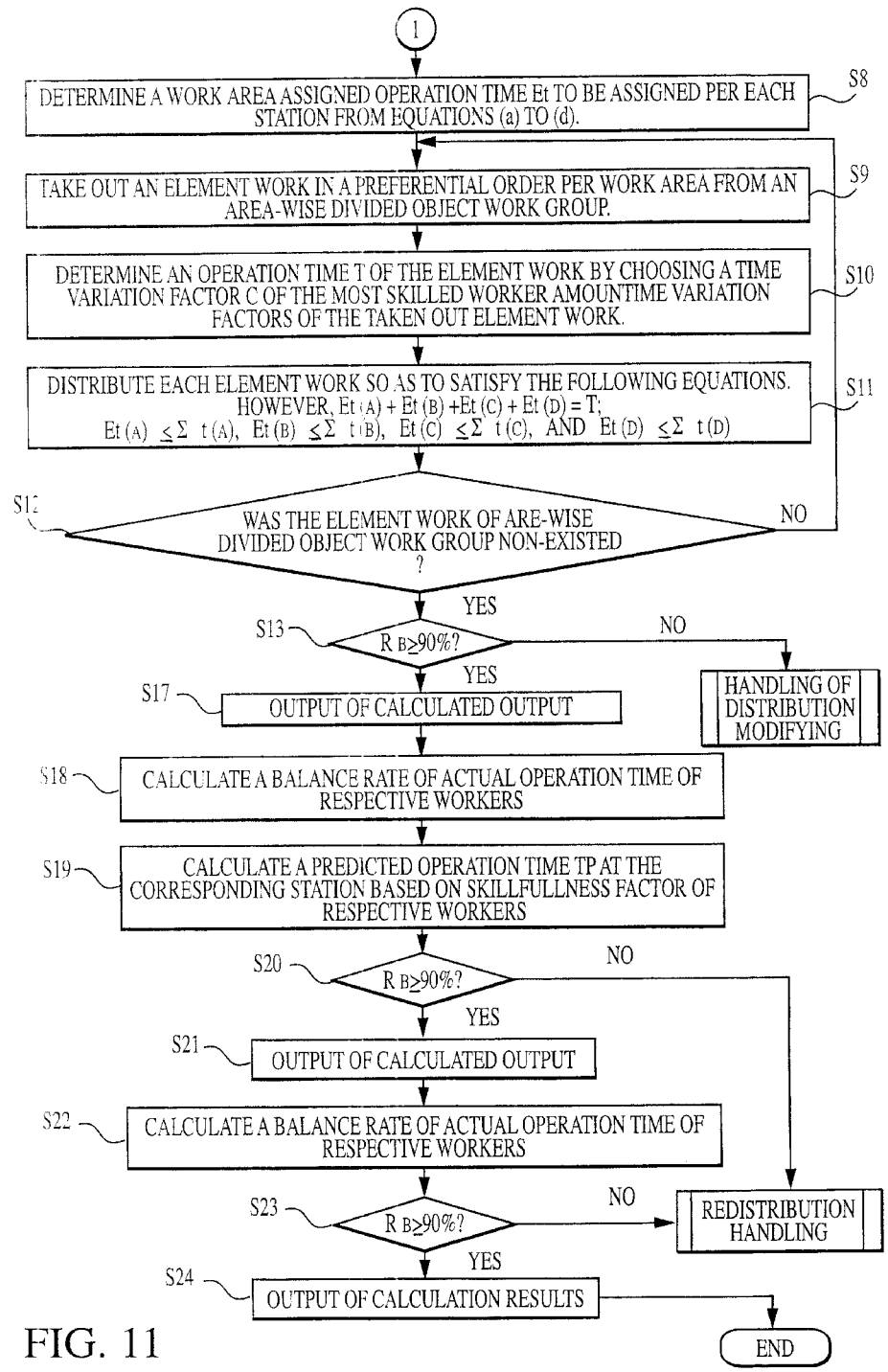
FIG. 11 is a flowchart illustrating additional steps of the distribution program of FIG. 8.
Figure 12:
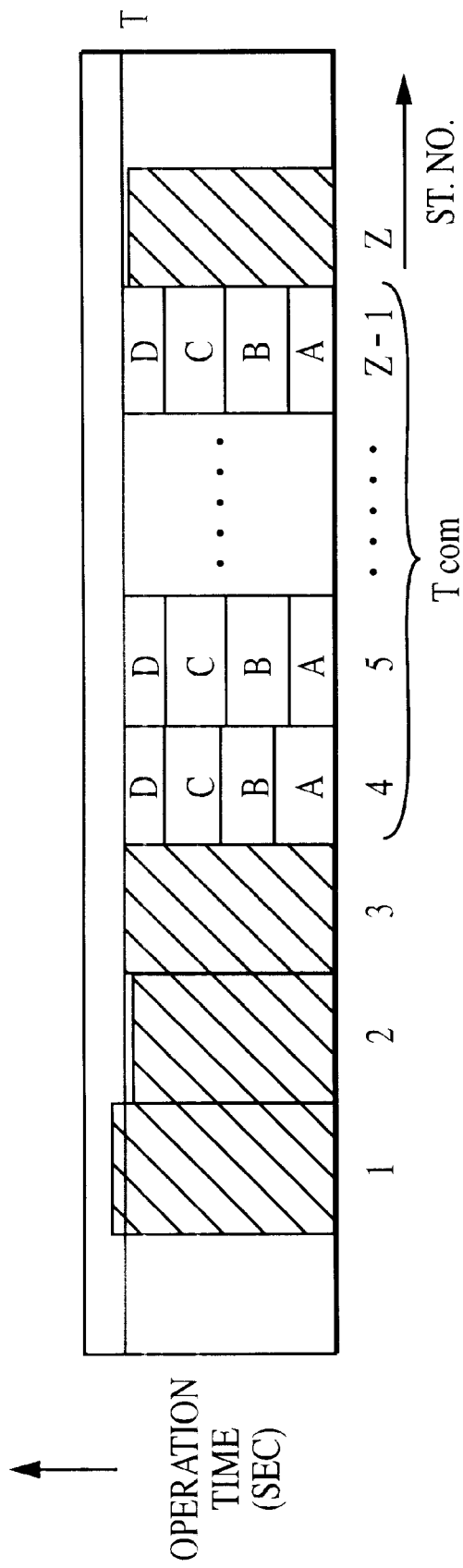
FIG. 12 is a drawing graphically illustrating distributed element works (tasks), based on the program steps executed in FIG. 11.

When it is determined in step S6 that an element work can be further distributed, the element work classified to the area-wise divided object work group is distributed from the end in a preferential sequential order in step S7. In addition, when $G_T \geq T-\alpha$, a shift is made in the element work distribution of the area-wise divided object work group, as shown in FIG. 11. FIG. 11 represents a flowchart illustrating a series of steps executed when a station does not reach the operation time value per worker. FIG. 12 represents a drawing graphically showing the element work distributed based on the steps illustrated in FIG. 11.

Referring to FIGS. 11 and 12, the distribution of the non-area-wise divided object work group is shifted (distributed) to distribution of the area-wise divided object work group, in step S8, according to the following formula:

[Numeric 1]
$$Et = \frac{\text{Total man-hour in a working area}}{\text{Total man-hour of stations split with area-wise divided object work group}} \times \text{Time variation factor}$$

An operation time Et to be assigned to each group is calculated for each work area. Based upon this formula, a time variation factor of the most skilled worker is assigned for time variation factor (i.e., variation coefficient) C. In particular, the shortest time (representing the most skilled worker) is set for the first simulation model. For example, when the distribution of the non-area wise divided object work group becomes equal to the distribution shown in FIG. 10, the distributed operation time $Et_{(A)-(D)}$ per worker (per one station) for each work area becomes as follows:

[numeric 2]
$$E_{t(A)} = \frac{TL_{comA}}{\{(z-1)-2-1)\}} \times C \quad (a)$$

[numeric 3]
$$E_{t(B)} = \frac{TL_{comB}}{\{(z-1)-2-1)\}} \times C \quad (b)$$

[numeric 4]
$$E_{t(C)} = \frac{TL_{comC}}{\{(z-1)-2-1)\}} \times C \quad (c)$$

[numeric 5]
$$E_{t(D)} = \frac{TL_{comD}}{\{(z-1)-2-1)\}} \times C \quad (d)$$

where $TL_{COMA}$ to $TL_{COMD}$ represents the total man-hours required for every area, and where Z represents the number of workers.

Then, the element work (task) for every work area is taken out in a preferential order (i.e., in the order in which the tasks are performed, as viewed from a downstream flow side) from an area-wise divided object work group at step S9.

At step S10, the operation time T of the element work (task) is determined by choosing a time variation factor C of the most skilled worker from among a plurality of time variation factors of this element work (task).

Thereafter, step S11 is executed to satisfy the following equations, based upon the operation time T calculated in step S10:

$$E_{t(A)} \leq \Sigma t \quad (e)$$
$$E_{t(B)} \leq \Sigma t \quad (f)$$
$$E_{t(C)} \leq \Sigma t \quad (g)$$
$$E_{t(D)} \leq \Sigma t \quad (h)$$

It is noted that T is equal to $E_{t(A)} + E_{t(B)} + E_{t(C)} + E_{t(D)}$.

The element work to be distributed for every individual station is accumulated for every corresponding element work, and the corresponding element work is grouped. Based upon this operation, as shown in FIG. 12, the element work for every area is arranged in an order from a lower flow side in the transport direction (see FIG. 7), and the order of the element work within each area is arranged in a handling order.

When the distribution of the element work is finished, step S12 is executed to determine whether the element work of the area-wise divided object work group no longer exists (i.e., whether all the tasks have been performed). When the determination is negative, the process from steps S9 to S12 is repeated; that is, the distribution work for all subsequent stations is repeated. When the decision at step S12 is affirmative (meaning that the element work no longer exists, i.e., that there are no tasks remaining to be performed), processing proceeds to step S13. In step S13, a distribution balance in each station to which work is to be assigned is checked.

Specifically, when the number of stations is n (from 1 to Z stations), an operation time at each station is Tn, and the longest operation time is $Tn_{(MAX)}$,

[Numeric 6]

$$R_B = \frac{\sum_{n=1}^{Z} Tn}{Tn_{(MAX)} \times Z}$$

A determination is then made as to whether the balance rate $R_B$, which was defined above in numeric 6 exceeds 90 percent. If the determination is negative (e.g.; the balance rate is less than 90 percent), the process proceeds to execute a distribution handling modifying routine. On the other hand, if the determination is affirmative (YES), processing proceeds to step S17 to output a calculated result as a favorable balance rate.

Figure 13:
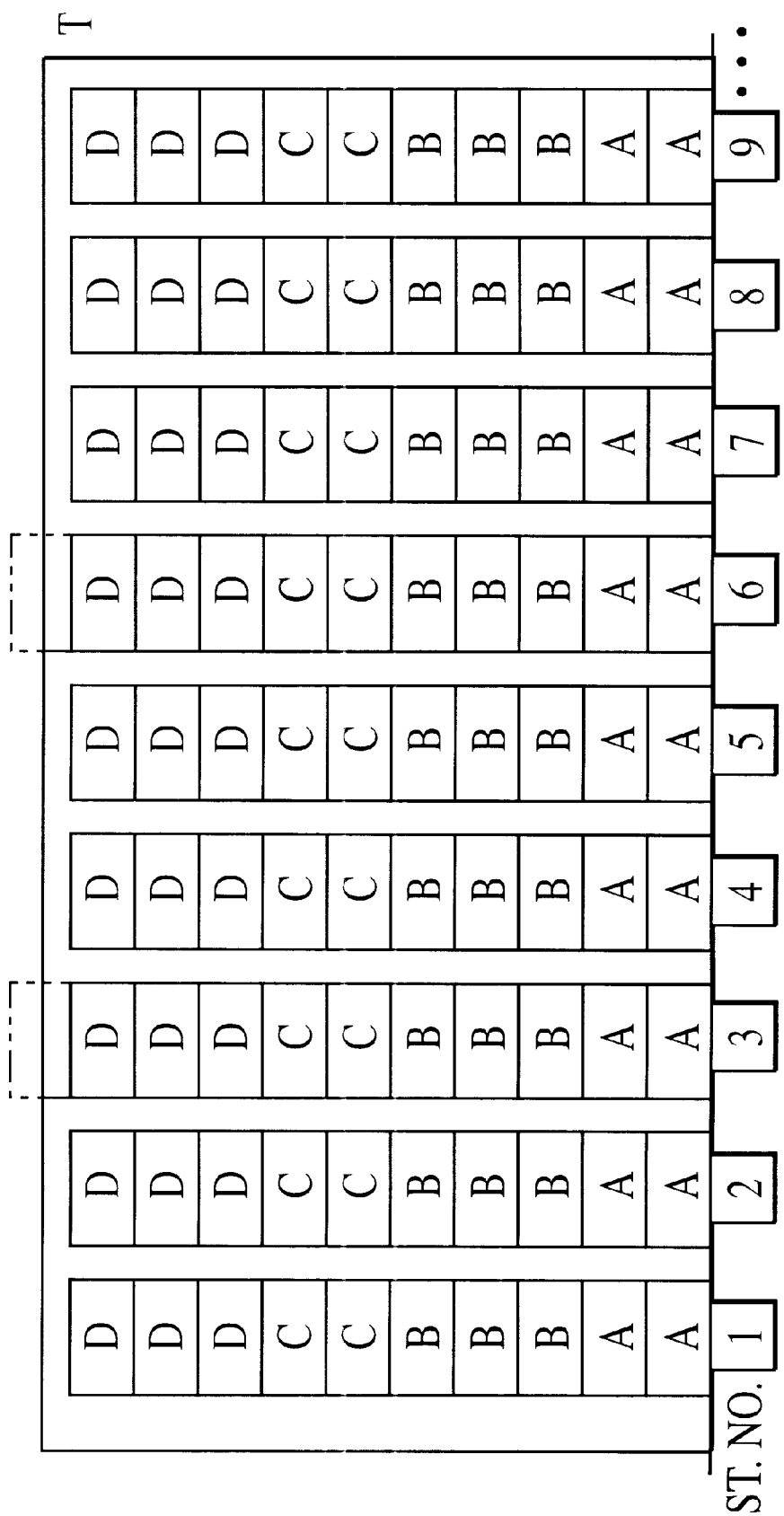
FIG. 13 is a pitch diagram showing a fundamental distribution pattern (e.g.; a time value marked by a most skilled worker), graphically showing each element work after being distributed.

FIG. 13 represents a pitch diagram of a fundamental distribution pattern (a time value marked by a most skilled worker) and graphically illustrates each element work after the distribution.

As shown by the solid line in FIG. 13, as a result of the distribution, when the balance rate exceeds 90 percent, all of them come close to the approximate point of the operation time value T per worker at each station ST. On the other hand, when the balance rate does not reach 90 percent, a variation arises, exceeding the operation time value T per worker by a total value Gr of the operation time value of any of the stations, as shown by the two-dot chain line in FIG. 12. When the two-dot chain line variation is detected in step S13, the process executes the distribution handling modifying routine, shown in FIG. 14.

In other words, when the balance rate is at least equal to 90 percent, the work distribution among the various works is evenly distributed, based upon the difficulty skills of each worker, so that no particular worker causes an undue delay in the production of the wire harness.

Figure 14:
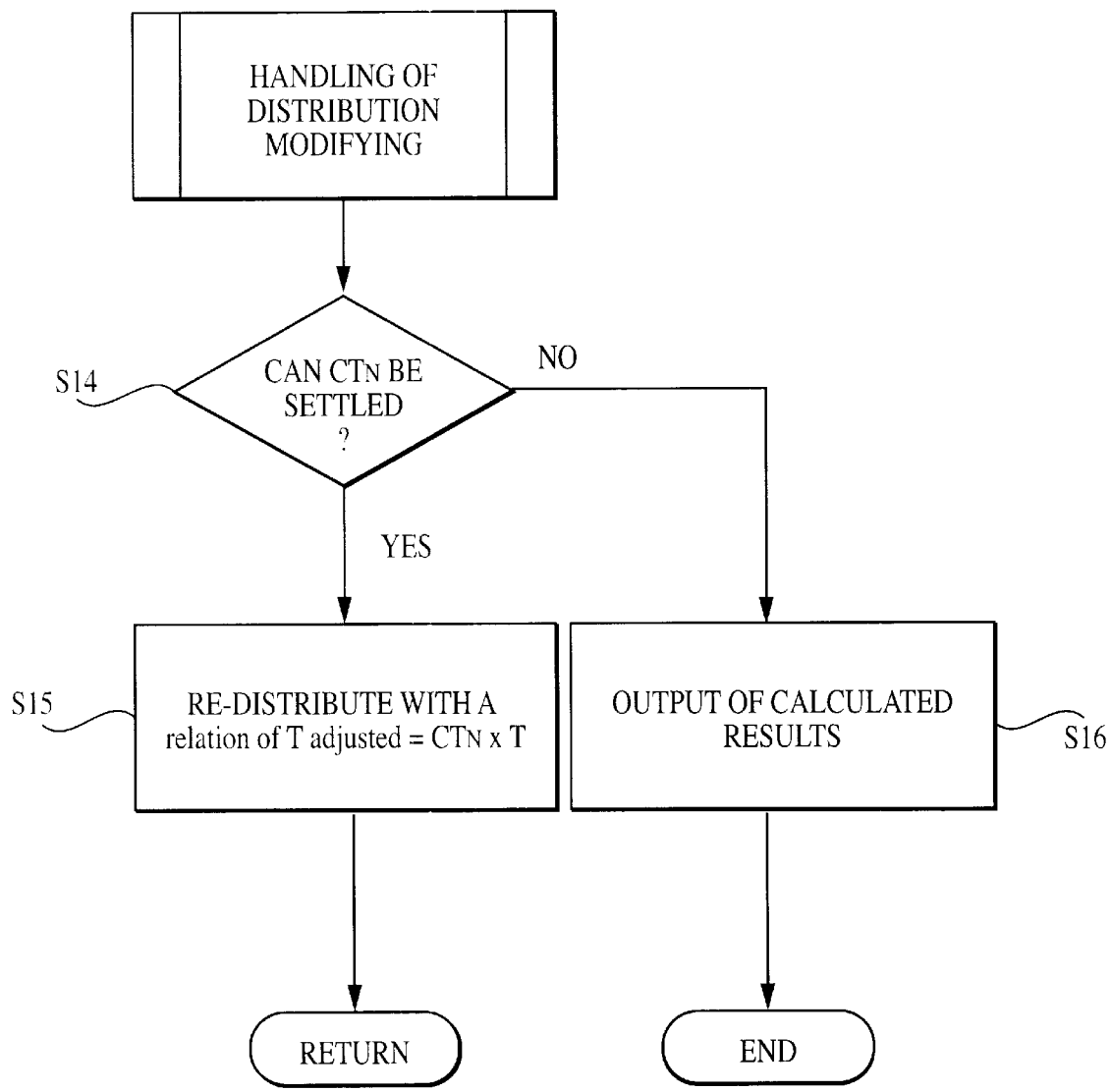
FIG. 14 is a flowchart illustrating a modifying handling distribution routine called by the distribution program of FIG. 11.

FIG. 14 illustrates a flowchart of the distribution handling modify routine. When this routine is called, step S14 is executed to determine whether a compensation factor $CT_N$ can be set. The compensation factor $CT_N$ is a numeric value (for instance, 1.01, 1.05, etc.) employed to adjust the operation time value T. When the numeric value $CT_N$ can be set, step S15 is executed to re-distribute the work, based upon the formula $T_{adjusted}=CT_N \times T$, and then processing returns to the program of FIG. 11. On the other hand, when the numeric value $CT_N$ is exhausted, or can not be set, step S16 is executed to output the calculated results, before returning to the program of FIG. 11.

Therefore, the element works (tasks) are distributed as uniformly as possible to each station ST1 to STz. In addition, the results show the line balance of an ideal condition.

Returning to the program of FIG. 11, when the calculation results at step S13 is equal to the condition shown by the solid line in FIG. 13, the calculated results are output at step S17, and each worker P is re-distributed among the stations at step S18. The re-distribution of workers at step S18 is made to automatically assign workers to the proper element works, by providing a difficulty level ranking for every station in advance, so that the most skilled worker is distributed to a station in which a difficult task is to be performed. In such a case, the computer 31 automatically calculates the difficulty level of the element work at each station in order to determine whether a particular station is classified as a difficult station.

Furthermore, a situation may arise in which the handling of work is not carried out (performed) according to the manner calculated by the computer 31, due, for example, to the actual capability of each worker P and the actual work conditions. In such a circumstance, a re-distribution handling is made, taking into account personal factors of the workers P. The operation time of each element work for the corresponding station is re-calculated based on the time variation factor of the workers distributed to each station, and the operation time of each station.

Figure 15:
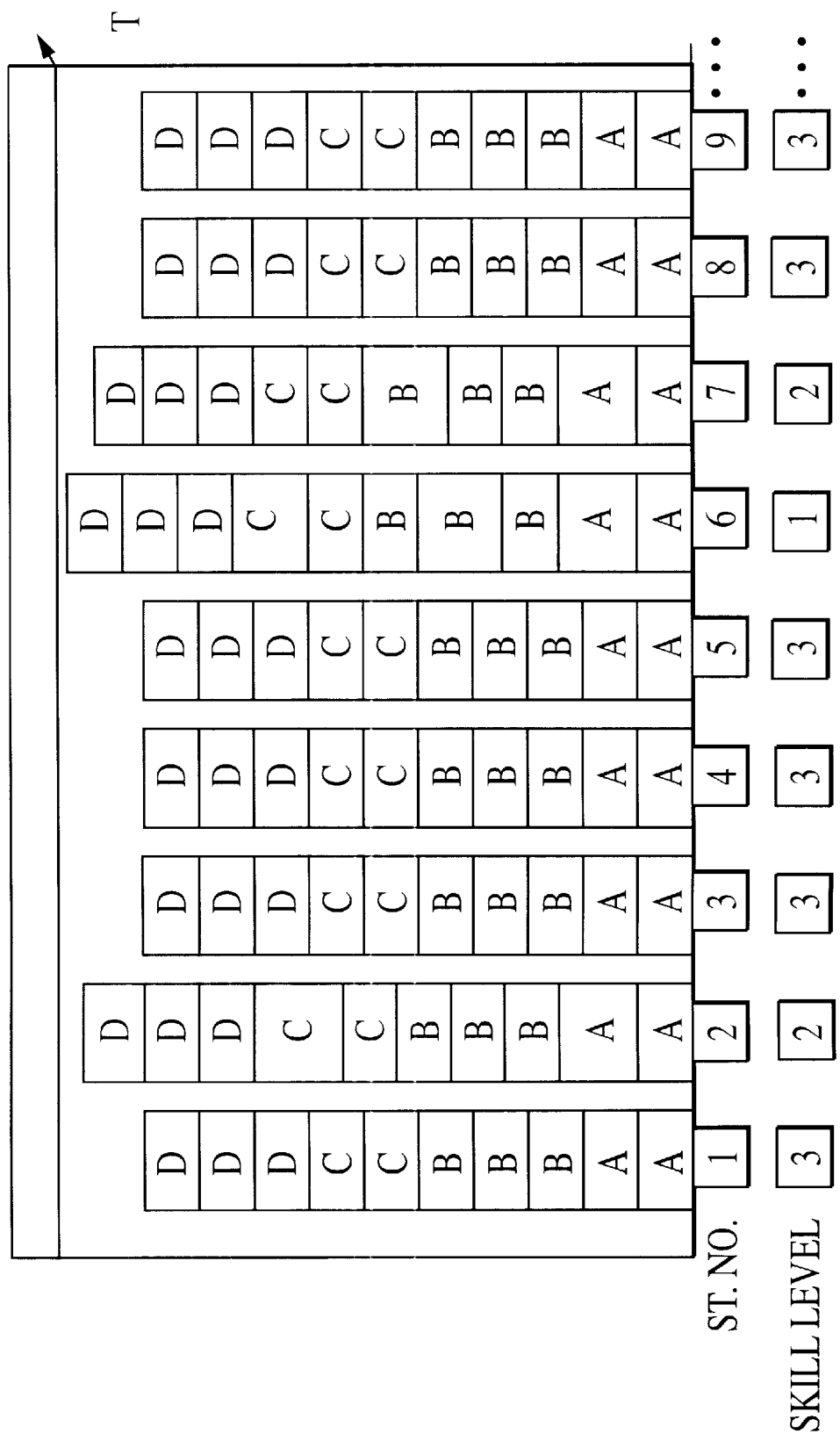
FIG. 15 is a pitch diagram graphically showing a fundamental distribution pattern of each element work after being distributed among the plurality of workers.

FIG. 15 represents a pitch diagram showing a fundamental distribution pattern graphically showing each element work and the distribution of workers P. As shown in FIG. 15, and step S19 of FIG. 11, a predicted operation time is calculated for each station based upon the skill factor of the respective workers. At step S20, a value of this variation is re-investigated using numeric 6 formula from above. When the balance rate $R_B$ equals or exceeds 90 percent, the calculated results are output as a favorable balance rate (step S21). However, when the balance rate $R_B$ is less than 90 percent, the redistribution handling routine, to be discussed below, is executed.

If the balance rate RB is at least equal to 90 percent, or if it is at least equal to 90 percent after the redistribution handling routine (that follows), the balance rate of the actual operation time of the respective workers is calculated at step S22. As discussed above with respect to FIG. 1, work switches 13 are actuated by the workers to obtain a measurement of the real operation time for the respective worker P to perform the actual assembling work. Based on the accumulated results, the variation of the actual operation time (e.g.; the difference between the calculated time and the actual time to do the assembling work) is determined (step S23) based on numeric 6.

As indicated above, when the balance rate $R_B$ is less than 90 percent, the redistribution handling routine is performed, while, when the balance rate $R_B$ is at least equal to 90 percent, the calculated results are output at step S24. In such a case, the above-mentioned output handling comprises displaying the calculated results on the display 4 associated with the computer 31, printing the work distribution assignment using the printer 5 associated with the computer 31, and instructing the assembling line 1 to move the transport plate 11 (with the work to be performed thereon) between the plurality of stations under the direction of the controller 2 (see FIG. 1).

Figure 16:
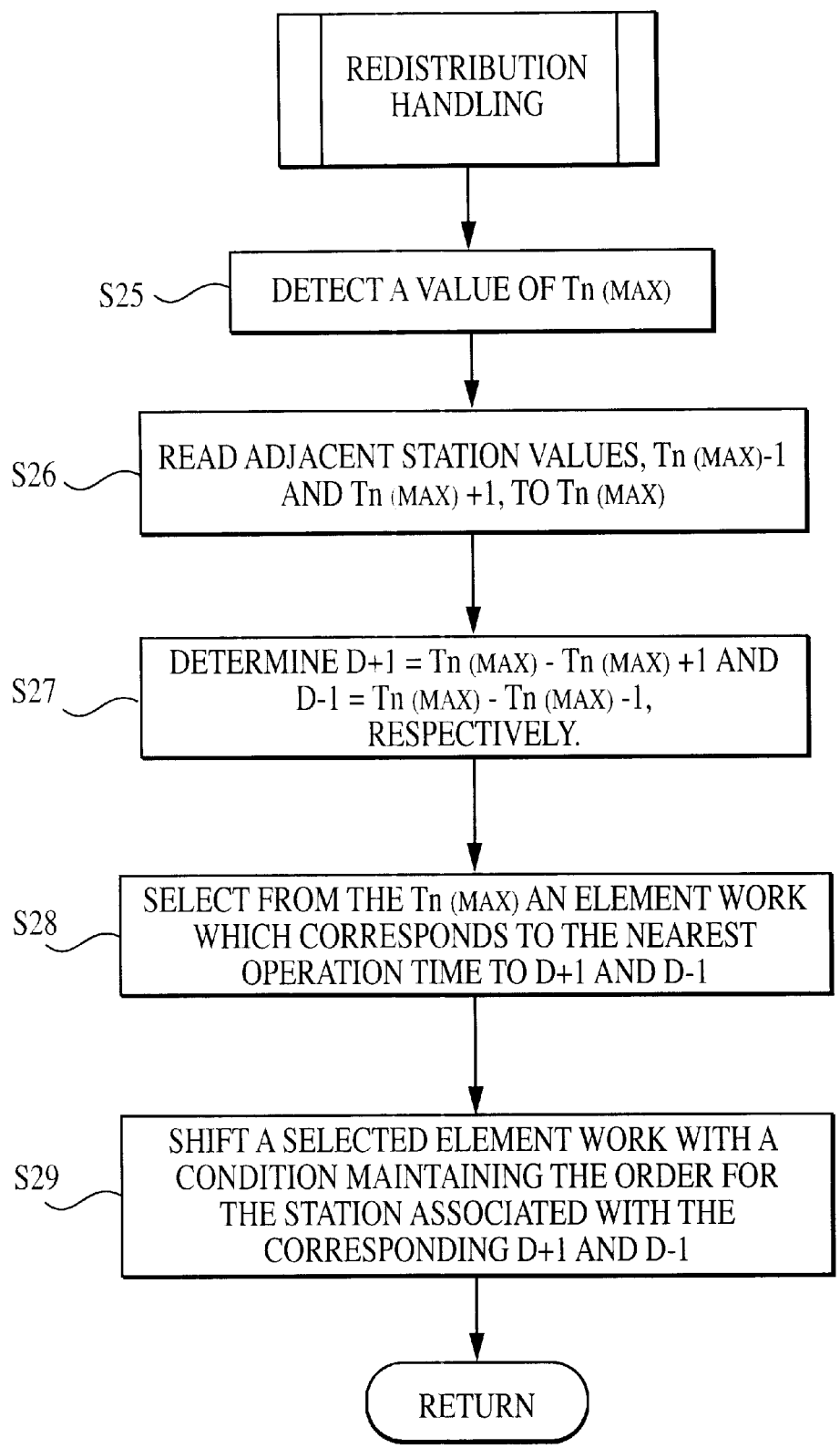
FIG. 16 is a flowchart of a redistribution handling routine called by the distribution program of FIG. 11.
Figures 17A, 17B:
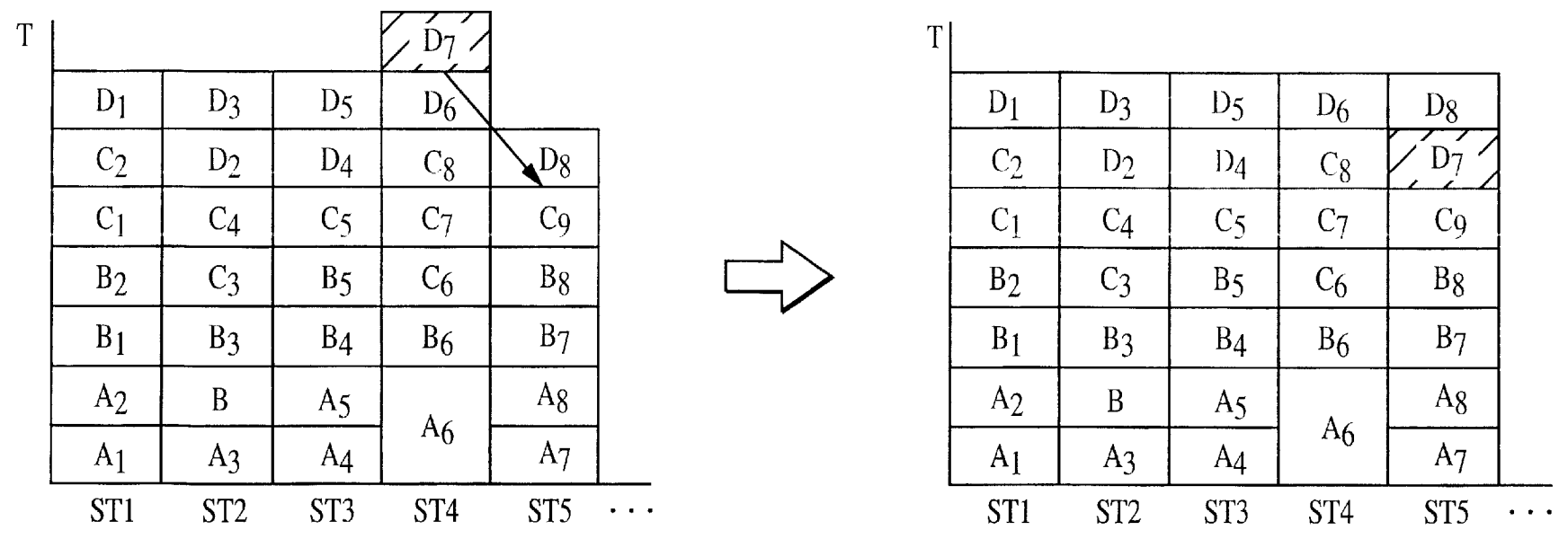
Figures 18A, 18B:
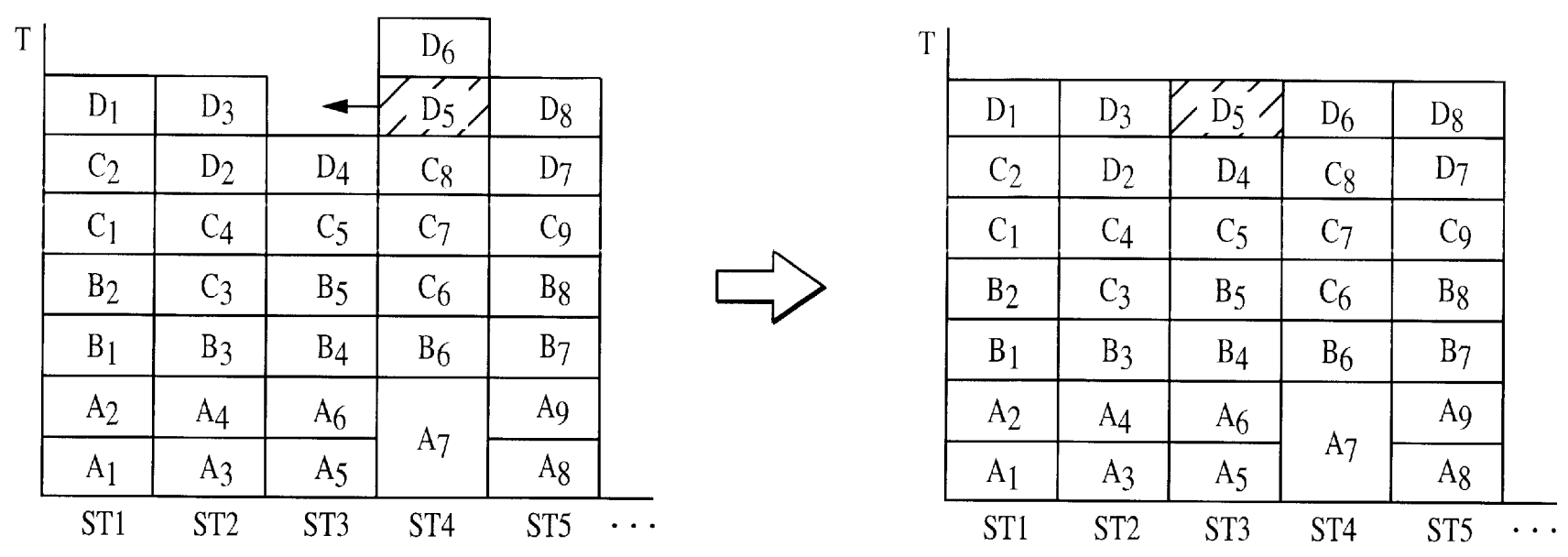
Figures 19A, 19B:
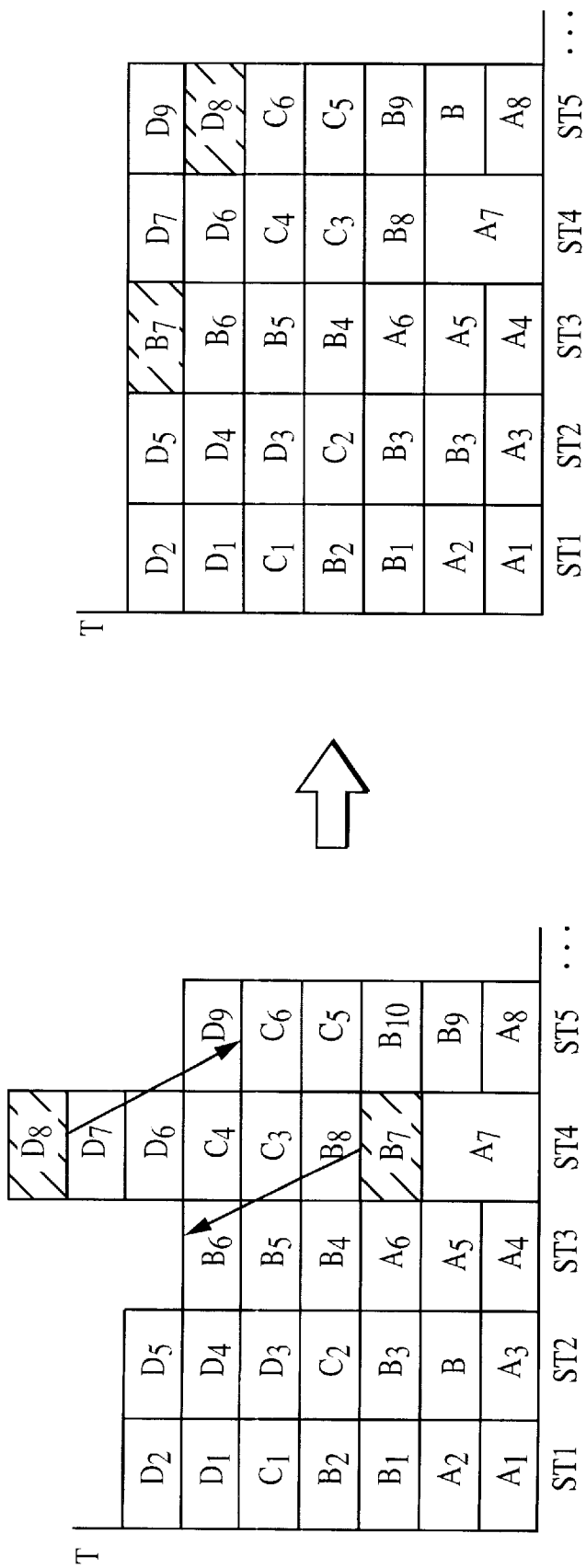

FIG. 16 illustrates a flowchart illustrating the redistribution handling routine called by the program of FIG. 11. Further, FIGS. 17 to 19 represent pitch diagrams graphically showing the process of redistribution, in which FIGS. 17(A), 18(A) and 19(A) represent a condition before the distribution, while FIGS. 17(B), 18(B) and 19(B) represent the process after the redistribution. When the redistribution handling routine is called, an operation time $T_{n(MAX)}$, related to a station taking the most time to perform a task, is determined at step S25. It is noted that FIGS. 17(A), 18(A) and 19(A) show that the operation time at station ST4 is mostly used up.

Thereafter, at step S26, an operation time of the adjacent stations (e.g.; the stations adjacent to the station related to work $T_{n(MAX)}$), is read. FIGS. 17(A), 18(A) and 19(A) show the operation time $T_{n(MAX)-1}$ of station ST3 and $T_{n(MAX)+1}$ of station ST5 (which are adjacent to station ST4) are read.

Step S27 is then executed to calculate operation times $D_{-1}$ and $D_{+1}$, according to the following formulas:

$$D_{-1} = T_{n(MAX)} - T_{n(MAX)-1}; \quad (i)$$

and $$D_{+1} = T_{n(MAX)} - T_{n(MAX)+1}. \quad (j)$$

When values $D_{-1}$ and $D_{+1}$ are determined, step S28 is performed, in which the element work from the station related to $T_{n(MAX)}$ is selected corresponding to the operation time nearest to $D_{-1}$ and $D_{+1}$. The values $D_{-1}$ and $D_{+1}$ correspond to the stations before and after the station related to $T_{n(MAX)}$, respectively. The selected element work (task) is then shifted (step S29) to maintain the order for the station associated with the corresponding values $D_{-1}$ and $D_{+1}$.

For instance, in FIGS. 17(A) and 17(B), the element work D (in which the suffix represents the order of the process) of station ST4 from formulae (i) and (j), above, is selected and re-distributed before element work $D_6$ in work area D in the succeeding station ST5, so that element work $D_7$ is carried out prior to element work $D_8$. Determining which re-distributed work to choose from A, B, C, D, etc. is performed by examining the element work in an area whose time rate is the highest among A, B, C, D, etc., and is considered as a re-distribution divided object work in the element work at a station whose time differs the most compared with that of other stations. The largest time is suggestive of a case in which the workers must move too much about the assembling line 1 to perform their work.

In FIGS. 18(A) and 18(B), element work $D_5$ of station ST4 is re-distributed after element work $D_4$ in work area D of preceding station ST3, so that element work $D_5$ is handled after element work $D_4$.

Further, FIGS. 19(A) and 19(B) illustrate that element work $B_7$ is re-distributed after element work $B_6$ in work area B of preceding station ST3, so that element work $B_7$ is handled after (considered time-wise) element work $B_6$. In addition, element work $D_8$ is re-distributed before element work $D_9$ in work area D of following station ST5, so that element work $D_8$ is handled prior to element work $D_9$.

If an unbalance situation does arise, the unbalance situation can be handled by changing the operation time T in steps S14 to S16 of the distribution handling modifying routine.

As explained above, by designing a method for distributing workers based upon the difficulty of the work and the worker's skill, changes can easily be implemented within a short period of time, thereby increasing the efficiency of the assembling line.

In addition, because the optimization of the work distribution is based upon the difficulty level of the work, the number of available workers, and the skill of the workers, the work efficiency of the assembling line can be maximized.

Figure 20:
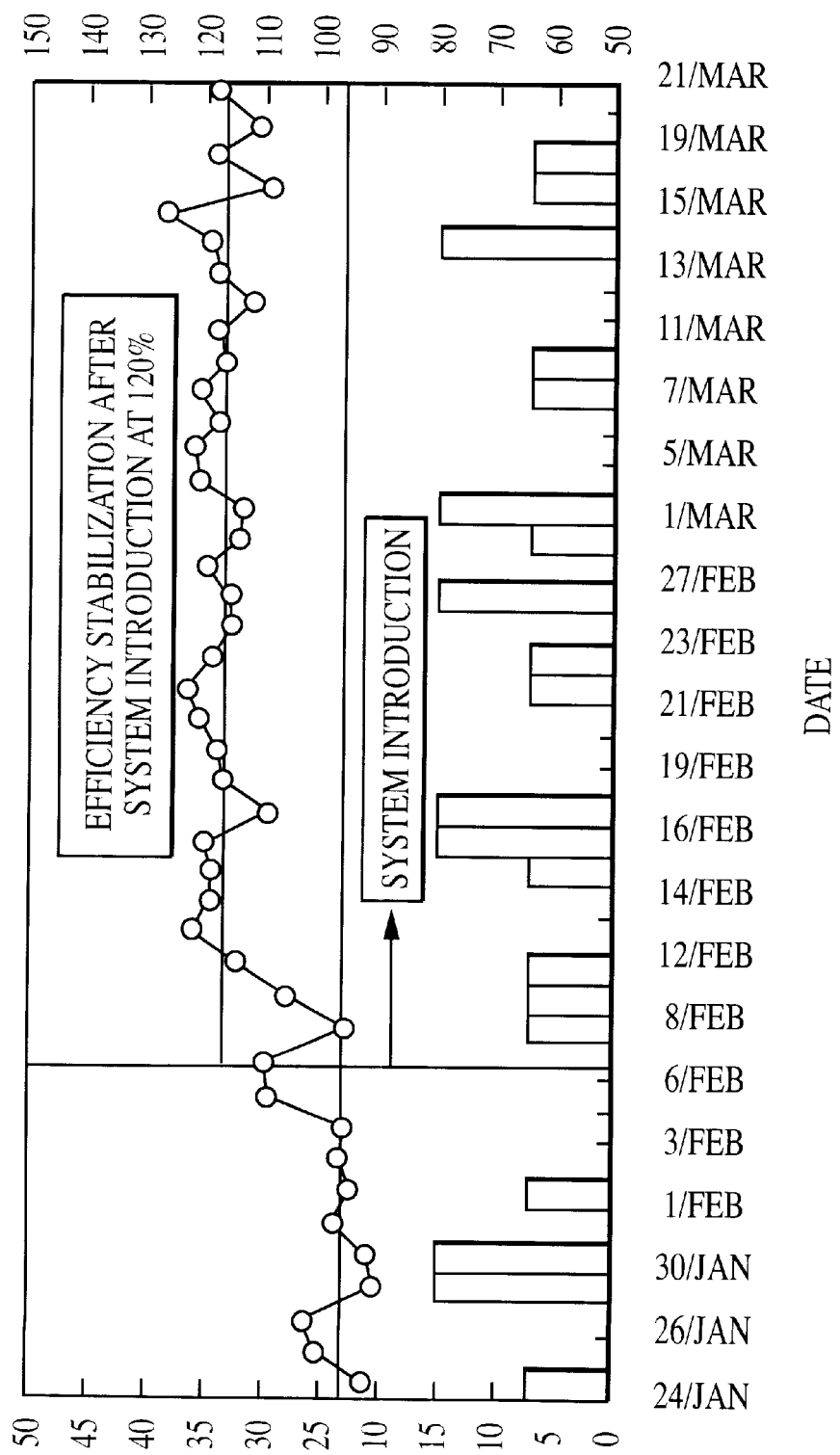
FIG. 20 illustrates a graph showing the efficiency of workers manufacturing a wire harness, before and after the present invention was applied to the manufacturing of the wire harness.

FIG. 20 represents a graph showing the work efficiency (for manufacturing a wire harness) based upon the present invention. In FIG. 20, a bar graph illustrates an absentee rate of the workers, while a polygonal line graph represents the efficiency of the workers. The present invention was implemented to manufacture wire harnesses on Feb. 6, 1997. As shown in FIG. 20, the absentee rate of the workers before and after the Feb. 6, 1997 introduction of the instant invention remained comparable. However, the efficiency of the assembling line 1 increased to above 110 percent at all times once the system was introduced.

Thus, work distribution can be easily determined with the embodiment as described. Moreover, the increased efficiency results can be achieved while keeping an operation time at each station ST in equilibrium with one another, and without implementing radical changes in the order of work for every element work.

Although the invention has been described with reference to particular means, materials and embodiments, it is to be understood that the invention is not limited to the particulars disclosed, but extends to all equivalents within the scope of the claims.

Further, while the present invention has been described with respect to the production of a wire harness, it is understood that the instant invention is equally applicable to the production of products other than wire harnesses. Accordingly, the instant invention is not limited to the item of manufacture (e.g., wire harness) discussed herein.

What is claimed is:

1. A method for optimizing work distribution among multiple workers in handling a flow of production, said method comprising:

assigning a difficulty ranking to each task of a multiple-task assembly according to difficulty level;

assigning a skill ranking to each worker of the multiple workers for each task, according to the worker's skill level in performing that task;

setting time variation factors corresponding to each task, each time variation factor being representative of at least an increase in operation time between different skill levels of the multiple workers performing the corresponding task;

compensating an operation time of each task assigned to a worker according to the time variation factor set for that task; and maintaining an overall assigned operation time per worker in equilibrium among the multiple workers by distributing the tasks in a preferred order based on the compensated operation times.

2. The method according to claim 1, wherein said assigning a difficulty ranking includes collecting and analyzing Analytical Hierarchy Process data.

3. The method according to claim 1, wherein said assigning a skill ranking includes collecting and analyzing worker experience data and measured performance data.

4. The method according to claim 1, wherein said maintaining an overall assigned operation time per worker in equilibrium among the multiple workers by distributing the tasks in a preferred order based on the compensated operation times comprises:

shifting tasks among the multiple working areas to bring an overall assigned operation time for each worker to less than a predetermined threshold.

5. The method according to claim 4, wherein said predetermined threshold is approximately 90% of total man-hours of the multiple workers divided by a total number of the multiple workers.

6. The method according to claim 4, further comprising:

raising said predetermined threshold by a predetermined amount when shifting of tasks among the multiple working areas cannot bring the overall assigned operation time to less than the predetermined threshold.

7. The method according to claim 1, wherein said time variation factor increases in accordance with either one of a decrease in worker skill ranking or an increase in task difficulty ranking, and compounds with both of a decrease in worker skill ranking and an increase in task difficulty ranking.

8. The method according to claim 1, further comprising:

setting an overall assigned operation time per worker, checking if actual measured operation time exceeds the overall assigned operation time by a predetermined tolerance; and when said checking is true:

determining the excess time over the overall assigned operation time;

splitting a sub-task from the task assigned to the working area at a divisible point closest to half of said excess time; and shifting the sub-task to an adjacent working area while maintaining the preferred order of tasks.

9. The method according to claim 1, in which at least one said task comprises a multiple element task grouped to be indivisible as a single task.

10. A method for optimizing work distribution in a flow of production including multiple tasks having a preferred order along a conveyor which transports products by multiple workers, said method comprising:

setting a normal operation time per working area according to a total of working man-hours of the multiple workers and a total number of the multiple workers;

assigning working areas, including working areas along the conveyor in a continuous manner in a reverse-flow direction to the conveyor;

classifying each task of the multiple tasks as one of: divisible tasks, including at least two sub-tasks assignable among separate working areas; and non-divisible tasks, including one or more sub-tasks which may only be assigned to a same working area;

classifying said indivisible tasks as one of: prior handling indivisible tasks, to be performed before all of said divisible task; and post handling indivisible tasks, to be performed after all of said divisible tasks;

distributing said prior handling indivisible tasks to said working areas in order from an earliest working area in the flow of production, an operation time of said prior handling indivisible tasks per worker being no greater than said normal operation time, and a preferred order of said prior handling indivisible tasks being maintained;

distributing said divisible tasks to said working areas and ordered after the prior handling indivisible tasks, an operation time of divisible tasks assigned to each working area being no greater than said normal operation time, and a preferred order of the divisible tasks being maintained; and distributing said multiple tasks to said working areas in approximate equilibrium by, when assigned operation times at working areas along the conveyor vary from one other, shifting at least one task from one working area to an adjacent working area while maintaining the preferred order of tasks within said one working area and among said working areas.

11. The method according to claim 10, wherein said distributing said multiple tasks comprises:

distributing said divisible tasks to said working areas in approximate equilibrium by, when assigned operation times at working areas along the conveyor vary from one other, shifting at least one sub-task of said divisible tasks from one working area to an adjacent working area while maintaining the preferred order of sub-tasks within said one working area and among said working areas.

12. The method according to claim 10, wherein said distributing said multiple tasks comprises:

distributing said indivisible tasks to said working areas in approximate equilibrium by, when assigned operation times at working areas along the conveyor vary from one other, shifting at least one indivisible task from one working area to an adjacent working area while maintaining the preferred order of indivisible tasks within said one working area and among said working areas.

13. The method according to claim 10, further comprising:

distributing said post handling indivisible tasks to said working areas in reverse order from a last working area in said flow of production, an operation time of said post handling indivisible tasks per worker being no greater than said normal operation time, and the preferred order of said post handling indivisible tasks being maintained.

14. The method according to claim 10, wherein said shifting at least one task from one working area to an adjacent working area while maintaining the preferred order of tasks within said one working area and among said working areas comprises:

shifting tasks among the working areas to bring an overall assigned operation time for each working area to less than a predetermined threshold.

15. The method according to claim 14, further comprising:

raising said predetermined threshold by a predetermined amount when said shifting tasks among the working areas cannot bring the overall assigned operation time to less than the predetermined threshold.

16. The method according to claim 10, wherein said distributing said divisible tasks to working areas comprises:

distributing said divisible tasks to working areas along the conveyor in order such that when an assigned operation time of divisible tasks assigned to one working area has not yet reached said normal operation time, a sub-task from a subsequent divisible task in order is distributed to said one working area.

17. The method according to claim 10, wherein said distributing said divisible tasks to working areas comprises, when a last prior handling working area in which a prior handling indivisible task is distributed is less than said normal operation time:

distributing to said last working area at least one sub-task from a subsequent divisible task in order, such that an assigned operation time of indivisible and divisible tasks assigned to said last prior handling working area does not exceed said normal operation time.

18. The method according to claim 10, further comprising:

assigning a difficulty ranking to each task according to difficulty level;

assigning a skill ranking to each worker of the multiple workers for each task, according to the worker's skill level in performing each task;

setting time variation factors corresponding to each task, each time variation factor being representative of at least an increase in operation time between different skill levels of the multiple workers performing the corresponding task; and compensating an operation time of each task assigned to a worker according to the time variation factor set for that task;

wherein at least one of said distributing said prior handling indivisible tasks, said distributing said divisible tasks to working areas; and said distributing said multiple tasks in approximate equilibrium employs the compensated operation times therein.

19. The method according to claim 18, wherein said distributing said multiple tasks in approximate equilibrium employs the compensated operation times therein, thereby distributing said multiple tasks in approximate equilibrium by, when assigned compensated operation times at working areas along the conveyor vary from one other, shifting at least one task from one working area to an adjacent working area while maintaining the preferred order of tasks within said one working area and among said working areas.

20. An apparatus for optimizing work distribution among multiple workers in handling a flow of production, said apparatus comprising:

a plurality of working areas at which workers perform tasks assigned thereto;

a product database storing difficulty rankings of each task of a multiple-task assembly according to difficulty level;

a worker database storing skill rankings of each worker of the multiple workers for each task, according to the worker's skill level in performing that task;

a work distribution simulator storing variation factors corresponding to each task, each time variation factor being representative of at least an increase in operation time between different skill levels of the multiple workers performing the corresponding task;

said work distribution simulator compensating an operation time of each task assigned to a worker according to the time variation factor set for that task; and said work distribution simulator maintaining an overall assigned operation time per worker in equilibrium among the multiple workers by distributing the tasks to said working areas in a preferred order based on the compensated operation times.

21. The apparatus according to claim 20, wherein said difficulty rankings are in accordance with Analytical Hierarchy Process data.

22. The apparatus according to claim 20, wherein said skill rankings are in accordance with worker experience data and measured performance data.

23. The apparatus according to claim 20, wherein said work distribution simulator shifts tasks among the plurality of working areas to bring an overall assigned operation time for each worker to less than a predetermined threshold.

24. The apparatus according to claim 23, wherein said predetermined threshold is approximately 90% of total man-hours of the multiple workers divided by a total number of the multiple workers.

25. The apparatus according to claim 23, wherein said work distribution simulator raises said predetermined threshold by a predetermined amount when shifting of tasks among the plurality of working areas cannot bring the overall assigned operation time to less than the predetermined threshold.

26. The apparatus according to claim 20, wherein said time variation factor increases in accordance with either one of a decrease in worker skill ranking or an increase in task difficulty ranking, and compounds with both of a decrease in worker skill ranking and an increase in task difficulty ranking.

27. The apparatus according to claim 20, said work distribution simulator further sets an overall assigned operation time per worker, checks if actual measured operation time exceeds the overall assigned operation time by a predetermined tolerance; and when said checking is true, determines the excess time over the overall assigned operation time, splits a sub-task from the task assigned to the worker at a divisible point closest to half of said excess time, and shifts the sub-task to an adjacent worker while maintaining the preferred order of tasks.

28. The apparatus according to claim 20, in which at least one said task comprises a multiple element task grouped to be indivisible as a single task.

29. An apparatus for optimizing work distribution in a flow of production including multiple tasks having a preferred order along a conveyor which transports products by multiple workers, said apparatus comprising:

a plurality of working areas at which workers perform tasks assigned thereto, including working areas distributed along the conveyor in a continuous manner in an order of reverse-flow direction to the conveyor;

a work distribution simulator that sets a normal operation time per working area according to a total of working man-hours of the multiple workers and a total number of the multiple workers;

said work distribution simulator classifying each task of the multiple tasks as one of: divisible tasks, including at least two sub-tasks assignable among separate working areas; and non-divisible tasks, including one or more sub-tasks which may only be assigned to a same working area; and classifying said indivisible tasks as one of: prior handling indivisible tasks, to be performed before all of said divisible task; and post handling indivisible tasks, to be performed after all of said divisible tasks;

said work distribution simulator distributing said prior handling indivisible tasks to said working areas in order from an earliest working area in the flow of production, an operation time of said prior handling indivisible tasks per worker being no greater than said normal operation time, and a preferred order of said prior handling indivisible tasks being maintained;

said work distribution simulator distributing said divisible tasks to said working areas and ordered after the prior handling indivisible tasks, an operation time of divisible tasks assigned to each working area being no greater than said normal operation time, and a preferred order of the divisible tasks being maintained; and said work distribution simulator distributing said multiple tasks to said working areas in approximate equilibrium by, when assigned operation times at working areas vary from one other, shifting at least one task from one working area to an adjacent working area while maintaining the preferred order of tasks within said one working area and among said working areas.

30. The apparatus according to claim 29, wherein said work distribution simulator distributes said divisible tasks in approximate equilibrium by, when assigned operation times at working areas along the conveyor vary from one another, shifting at least one sub-task of said divisible tasks from one working area to an adjacent working area while maintaining the preferred order of sub-tasks within said one working area and among said working areas.

31. The apparatus according to claim 29, wherein said work distribution simulator distributes said indivisible tasks in approximate equilibrium by, when assigned operation times at working areas along the conveyor vary from one another, shifting at least one indivisible task from one working area to an adjacent working area while maintaining the preferred order of indivisible tasks within said one working area and among said working areas.

32. The apparatus according to claim 29, wherein said work distribution simulator distributes said post handling indivisible tasks in reverse order from a last worker in said flow of production, an operation time of said post handling indivisible tasks per worker being no greater than said normal operation time, and the preferred order of said post handling indivisible tasks being maintained.

33. The apparatus according to claim 29, wherein said work distribution simulator shifts tasks among the plurality of working areas to bring an overall assigned operation time for each working area to less than a predetermined threshold.

34. The apparatus according to claim 33, wherein said work distribution simulator raises said predetermined threshold by a predetermined amount when said shifting tasks among the plurality of working areas cannot bring the overall assigned operation time to less than the predetermined threshold.

35. The apparatus according to claim 29, wherein said work distribution simulator distributes said divisible tasks to working areas along the conveyor in order such that when an assigned operation time of divisible tasks assigned to one working area has not yet reached said normal operation time, a sub-task from a subsequent divisible task in order is distributed to said one working area.

36. The apparatus according to claim 29, wherein, when a last prior handling working area in which a prior handling indivisible task is distributed is less than said normal operation time, said work distribution simulator distributes to said last working area at least one sub-task from a subsequent divisible task in order, such that an assigned operation time of indivisible and divisible tasks assigned to said last prior handling working area does not exceed said normal operation time.

37. The apparatus according to claim 29, further comprising:

a product database storing difficulty rankings of each task according to difficulty level;

a worker database storing skill rankings of each worker of the multiple workers for each task, according to the worker's skill level in performing that task;

said work distribution simulator storing variation factors corresponding to each task, each time variation factor being representative of at least an increase in operation time between different skill levels of worker performing the corresponding task; and said work distribution simulator compensating an operation time of each task assigned to a worker according to the time variation factor set for that task, wherein said work distribution simulator employs the compensated operation times in at least one of distributing said prior handling indivisible tasks, distributing said divisible tasks to working areas; and distributing said multiple tasks in approximate equilibrium therein.

38. The apparatus according to claim 37, wherein said work distribution simulator employs the compensated operation times in distributing said multiple tasks in approximate equilibrium, thereby distributing said multiple tasks in approximate equilibrium by, when assigned compensated operation times at working areas along the conveyor vary from one other, shifting at least one task from one working area to an adjacent working area while maintaining the preferred order of tasks within said one working area and among said working areas.

* * * * *